United States Patent
Paz et al.

(10) Patent No.: US 12,237,952 B1
(45) Date of Patent: Feb. 25, 2025

(54) RECEIVER-SIDE NOISE STATISTICS AND LOG LIKELIHOOD RATIO SCALING FOR PRE-EQUALIZATION-BASED COMMUNICATION SCHEMES

(71) Applicant: QUALCOMM Incorporated, San Diego, CA (US)

(72) Inventors: Daniel Paz, Atlit (IL); Michael Levitsky, Rehovot (IL); Tom Barak, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/456,395

(22) Filed: Aug. 25, 2023

(51) Int. Cl.
*H04L 25/03* (2006.01)
*H04L 25/02* (2006.01)

(52) U.S. Cl.
CPC .... *H04L 25/03343* (2013.01); *H04L 25/0224* (2013.01); *H04L 25/0242* (2013.01); *H04L 25/03993* (2013.01)

(58) Field of Classification Search
CPC .......... H04L 25/0224; H04L 25/03343; H04L 25/0242; H04L 25/03993
See application file for complete search history.

(56) References Cited

U.S. PATENT DOCUMENTS

2022/0190963 A1* 6/2022 Horn ................... H04L 27/2624

FOREIGN PATENT DOCUMENTS

| EP | 1757000 B1 | 5/2011 |
|----|------------|--------|
| WO | 2022159222 A1 | 7/2022 |

OTHER PUBLICATIONS

Partial International Search Report—PCT/US2024/042727—ISA/EPO—Dec. 19, 2024.

* cited by examiner

*Primary Examiner* — Rahel Guarino
(74) *Attorney, Agent, or Firm* — Holland & Hart LLP

(57) ABSTRACT

Methods, systems, and devices for wireless communications are described. The described techniques provide for a user equipment (UE) to perform receiver-side noise statistics (Rnn) estimation and for an extended reality (XR) device to perform log likelihood ratio (LLR) scaling estimation. For example, the UE may transmit a first set of reference signals to the XR device. The XR device may sample the reference signals and transmit an indication of quantized samples such that the UE may perform Rnn estimations and generate a pre-equalization matrix. The UE may transmit a set of pre-equalized reference signals to the XR device such that the XR device may estimate LLR scaling coefficients. In some examples, the UE may determine the pre-equalization matrix by performing a filtering of reference signal measurements. The UE may apply whitening to account for momentary interference, and may indicate a whitening matrix to the XR device.

30 Claims, 14 Drawing Sheets

RECEIVER-SIDE NOISE STATISTICS AND LOG LIKELIHOOD RATIO SCALING FOR PRE-EQUALIZATION-BASED COMMUNICATION SCHEMES

FIELD OF TECHNOLOGY

The following relates to wireless communications, including receiver-side noise statistics (Rnn) and log likelihood ratio (LLR) scaling for pre-equalization-based communication schemes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support receiver-side noise statistics (Rnn) and log likelihood ratio (LLR) scaling for pre-equalization-based communication schemes. For example, the described techniques enable a user equipment (UE) to perform Rnn estimation and enable an extended reality (XR) device to use LLR scaling values for decoding pre-equalized transmissions, which may reduce processing, complexity, and power consumption by the XR device. According to some aspects, a UE may transmit a first set of reference signals (e.g., without pre-equalization) to the XR device. The XR device may sample the reference signals and transmit an indication of quantized samples such that the UE may perform channel estimations, Rnn estimations, and generate a pre-equalization matrix. In some examples, the UE may transmit a second set of reference signals (e.g., using the pre-equalization matrix) to the XR device, which the XR device may use to estimate LLR scaling coefficients. In some examples, the UE may estimate the LLR scaling coefficients, and may transmit the LLR scaling coefficients to the XR device. In some examples, the UE may determine the pre-equalization matrix by performing an averaging or filtering of reference signal measurements, or the UE may apply whitening to account for (e.g., reduce or prevent) momentary interference, and may indicate a whitening matrix to the XR device.

A method for wireless communications by a first UE is described. The method may include transmitting, to a second UE, a set of channel estimation reference signals dedicated for channel estimation of a channel between the first UE and the second UE, receiving, from the second UE and in response to the set of channel estimation reference signals, a set of quantized samples of the channel for channel estimation, the set of quantized samples based on the set of channel estimation reference signals, and transmitting, to the second UE, one or more pre-equalized transmissions that are pre-equalized based on a pre-equalization matrix, where the pre-equalization matrix is based on Rnn associated with the set of quantized samples of the channel.

A first UE for wireless communications is described. The first UE may include one or more memories storing processor executable code, and one or more processors coupled with the one or more memories. The one or more processors may individually or collectively operable to execute the code to cause the first UE to transmit, to a second UE, a set of channel estimation reference signals dedicated for channel estimation of a channel between the first UE and the second UE, receive, from the second UE and in response to the set of channel estimation reference signals, a set of quantized samples of the channel for channel estimation, the set of quantized samples based on the set of channel estimation reference signals, and transmit, to the second UE, one or more pre-equalized transmissions that are pre-equalized based on a pre-equalization matrix, where the pre-equalization matrix is based on Rnn associated with the set of quantized samples of the channel.

Another first UE for wireless communications is described. The first UE may include means for transmitting, to a second UE, a set of channel estimation reference signals dedicated for channel estimation of a channel between the first UE and the second UE, means for receiving, from the second UE and in response to the set of channel estimation reference signals, a set of quantized samples of the channel for channel estimation, the set of quantized samples based on the set of channel estimation reference signals, and means for transmitting, to the second UE, one or more pre-equalized transmissions that are pre-equalized based on a pre-equalization matrix, where the pre-equalization matrix is based on Rnn associated with the set of quantized samples of the channel.

A non-transitory computer-readable medium storing code for wireless communications is described. The code may include instructions executable by a processor to transmit, to a second UE, a set of channel estimation reference signals dedicated for channel estimation of a channel between the first UE and the second UE, receive, from the second UE and in response to the set of channel estimation reference signals, a set of quantized samples of the channel for channel estimation, the set of quantized samples based on the set of channel estimation reference signals, and transmit, to the second UE, one or more pre-equalized transmissions that are pre-equalized based on a pre-equalization matrix, where the pre-equalization matrix is based on Rnn associated with the set of quantized samples of the channel.

Some examples of the method, first UEs, and non-transitory computer-readable medium described herein may further include operations, features, means, or instructions for generating the pre-equalization matrix using one or more diagonal elements of a matrix associated with the Rnn based on a capability of second UE device to perform whitening.

Some examples of the method, first UEs, and non-transitory computer-readable medium described herein may further include operations, features, means, or instructions for generating the pre-equalization matrix using all elements of a matrix associated with the Rnn based on a capability of the second UE to perform whitening.

Some examples of the method, first UEs, and non-transitory computer-readable medium described herein may further include operations, features, means, or instructions for generating the Rnn based on filtering a set of multiple matrices associated with Rnn, where the set of multiple matrices may be based on a set of multiple quantized samples of the channel, and where the set of multiple quantized samples of the channel includes the set of quantized samples of the channel.

Some examples of the method, first UEs, and non-transitory computer-readable medium described herein may further include operations, features, means, or instructions for receiving, from the second UE, a capability message that indicates a capability of the second UE to perform whitening.

Some examples of the method, first UEs, and non-transitory computer-readable medium described herein may further include operations, features, means, or instructions for transmitting, to the second UE, a message indicating one or more whitening matrices for the second UE to apply to the channel, where the message may be transmitted based on the capability of the second UE to perform whitening.

Some examples of the method, first UEs, and non-transitory computer-readable medium described herein may further include operations, features, means, or instructions for transmitting, to the second UE, one or more pre-equalized reference signals that may be pre-equalized based on the pre-equalization matrix, where transmission of the one or more pre-equalized reference signals may be based on a capability of the second UE to perform LLR scaling estimation.

Some examples of the method, first UEs, and non-transitory computer-readable medium described herein may further include operations, features, means, or instructions for receiving, from the second UE, a capability message indicating the capability of the second UE to perform LLR scaling estimation.

Some examples of the method, first UEs, and non-transitory computer-readable medium described herein may further include operations, features, means, or instructions for selecting a resource allocation associated with the one or more pre-equalized reference signals based on one or more characteristics of the channel and the capability of the second UE to perform LLR scaling estimation, where selecting the resource allocation includes selecting the resource allocation from a set of multiple configured resource allocations associated with the one or more pre-equalized reference signals.

Some examples of the method, first UEs, and non-transitory computer-readable medium described herein may further include operations, features, means, or instructions for transmitting, to the second UE, a message indicating a configuration of the resource allocation associated with the one or more pre-equalized reference signals.

In some examples of the method, first UEs, and non-transitory computer-readable medium described herein, the one or more characteristics of the channel include a SNR, a SNIR, an interference associated with the channel, a quality associated with the channel, or some combination thereof.

Some examples of the method, first UEs, and non-transitory computer-readable medium described herein may further include operations, features, means, or instructions for transmitting, to the second UE, a message indicating one or more LLR scaling values.

A method for wireless communications by a second UE is described. The method may include receiving, from a first UE, a set of channel estimation reference signals dedicated for channel estimation of a channel between the second UE and the first UE, transmitting, to the first UE and in response to the set of channel estimation reference signals, a set of quantized samples of the channel for channel estimation, the set of quantized samples based on the set of channel estimation reference signals, and receiving, from the first UE, one or more pre-equalized transmissions that are pre-equalized based on a pre-equalization matrix, where the pre-equalization matrix is based on Rnn associated with the set of quantized samples of the channel.

A second UE for wireless communications is described. The second UE may include one or more memories storing processor executable code, and one or more processors coupled with the one or more memories. The one or more processors may individually or collectively operable to execute the code to cause the second UE to receive, from a first UE, a set of channel estimation reference signals dedicated for channel estimation of a channel between the second UE and the first UE, transmit, to the first UE and in response to the set of channel estimation reference signals, a set of quantized samples of the channel for channel estimation, the set of quantized samples based on the set of channel estimation reference signals, and receive, from the first UE, one or more pre-equalized transmissions that are pre-equalized based on a pre-equalization matrix, where the pre-equalization matrix is based on Rnn associated with the set of quantized samples of the channel.

Another second UE for wireless communications is described. The second UE may include means for receiving, from a first UE, a set of channel estimation reference signals dedicated for channel estimation of a channel between the second UE and the first UE, means for transmitting, to the first UE and in response to the set of channel estimation reference signals, a set of quantized samples of the channel for channel estimation, the set of quantized samples based on the set of channel estimation reference signals, and means for receiving, from the first UE, one or more pre-equalized transmissions that are pre-equalized based on a pre-equalization matrix, where the pre-equalization matrix is based on Rnn associated with the set of quantized samples of the channel.

A non-transitory computer-readable medium storing code for wireless communications is described. The code may include instructions executable by a processor to receive, from a first UE, a set of channel estimation reference signals dedicated for channel estimation of a channel between the second UE and the first UE, transmit, to the first UE and in response to the set of channel estimation reference signals, a set of quantized samples of the channel for channel estimation, the set of quantized samples based on the set of channel estimation reference signals, and receive, from the first UE, one or more pre-equalized transmissions that are pre-equalized based on a pre-equalization matrix, where the pre-equalization matrix is based on Rnn associated with the set of quantized samples of the channel.

Some examples of the method, second UEs, and non-transitory computer-readable medium described herein may further include operations, features, means, or instructions for receiving, from the first UE, one or more pre-equalized reference signals that may be pre-equalized based on the pre-equalization matrix, where receiving the one or more pre-equalized reference signals may be based on a capability of the second UE to perform LLR scaling estimation.

Some examples of the method, second UEs, and non-transitory computer-readable medium described herein may further include operations, features, means, or instructions for transmitting, to the first UE, a capability message indicating the capability of the second UE to perform LLR scaling estimation.

Some examples of the method, second UEs, and non-transitory computer-readable medium described herein may further include operations, features, means, or instructions for receiving, from the first UE, a message indicating a configuration of a resource allocation associated with the one or more pre-equalized reference signals.

Some examples of the method, second UEs, and non-transitory computer-readable medium described herein may further include operations, features, means, or instructions for generating one or more LLR scaling values based on measurements of the one or more pre-equalized reference signals.

Some examples of the method, second UEs, and non-transitory computer-readable medium described herein may further include operations, features, means, or instructions for transmitting, to the first UE, a capability message that indicates a capability of the second UE to perform whitening.

Some examples of the method, second UEs, and non-transitory computer-readable medium described herein may further include operations, features, means, or instructions for receiving, from the first UE, a message indicating one or more whitening matrices for the second UE to apply to the channel, where the message may be received based on the capability of the second UE to perform whitening.

Some examples of the method, second UEs, and non-transitory computer-readable medium described herein may further include operations, features, means, or instructions for receiving, from the first UE, a message indicating one or more LLR scaling values.

DETAILED DESCRIPTION

Figure 1:
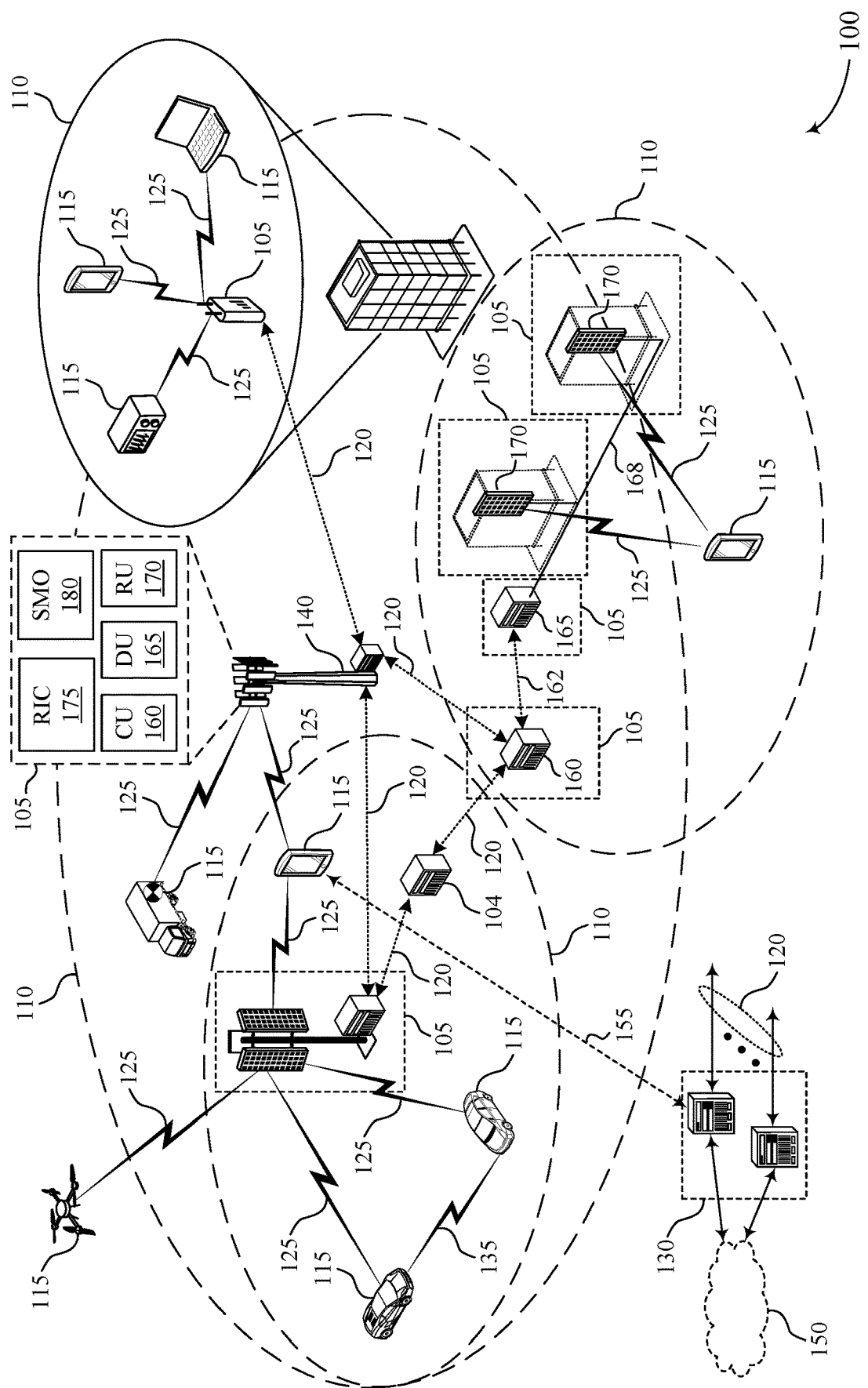
FIG. 1 shows an example of a wireless communications system that supports receiver-side noise statistics (Rnn) and log likelihood ratio (LLR) scaling for pre-equalization-based communication schemes in accordance with one or more aspects of the present disclosure.

In some wireless communications systems, a user equipment (UE) may transmit data to an extended reality (XR) device (e.g., for projection by the XR device to a user of the XR device). However, some XR devices may have size and power consumption constraints, and performing channel estimations and channel equalization may increase power consumption and complexity of the XR device. Accordingly, the UE may instead perform channel estimations on a link (e.g., channel) between the UE to the XR device by transmitting reference signals to the XR device and receiving quantized samples of the reference signals from the XR device. The UE may in some cases perform a pre-equalization on transmissions to the XR device to compensate for distortions (e.g., due to noise). However, the UE may not have access to receiver-side noise statistics (Rnn) derived from the channel estimations which may be used as part of the calculation and application of the pre-equalization. That is, the UE may not be aware of noise statistics associated with receiving transmissions from the UE at the receiver of the XR device. Further, Rnn may be susceptible to momentary interference, which may result in a corrupted pre-equalization matrix (e.g., a pre-equalization matrix which be inaccurate (e.g., may not be applicable to signals) in the absence of the momentary interference).

Accordingly, techniques described herein may enable a UE to perform Rnn estimation, which may reduce processing complexity, and power consumption by an XR device. For example, the UE may transmit a first set of reference signals (e.g., without applying a pre-equalization matrix) to the XR device. The XR device may sample the reference signals and perform a quantization to generate a set of quantized samples of a channel between the UE and the XR device. The XR device may transmit an indication of the set of quantized samples of the channel such that the UE may perform channel estimations and determine an Rnn matrix. The UE may use the Rnn matrix to generate a pre-equalization matrix. In some examples, to prevent or reduce corruption due to momentary interference, the UE may generate the pre-equalization matrix by performing an averaging or filtering of multiple Rnn matrices generated from multiple sets of quantized samples of the channel.

Additionally, or alternatively, the described techniques may enable the XR device to perform LLR scaling estimation. For example, the UE may transmit a second set of pre-equalized reference signals (e.g., using the pre-equalization matrix) to the XR device such that the XR device may estimate one or more LLR scaling coefficients. The XR device may use the one or more LLR scaling coefficients to decode one or more transmissions from the UE. In some examples, the XR device may transmit one or more capability messages indicating a capability of the XR device to perform whitening, LLR scaling estimation, or both. The UE may, additionally, or alternatively, transmit an indication of the LLR scaling coefficients (e.g., determined by the UE based on the quantized samples of the channel) to the XR device based on the capability of the XR device to perform LLR scaling estimation. The UE may, additionally, or alternatively, apply whitening to the one or more transmissions (e.g., to account for momentary interference), and may indicate a whitening matrix to the XR device for the XR device to apply to the one or more transmissions.

Aspects of the disclosure are initially described in the context of wireless communications systems. Aspects of the disclosure are further illustrated by and described with reference to flow charts and process flow diagrams. Aspects of the disclosure are further illustrated by and described with reference to apparatus diagrams, system diagrams, and flowcharts that relate to Rnn and LLR scaling for pre-equalization-based communication schemes.

FIG. 1 shows an example of a wireless communications system 100 that supports Rnn and LLR scaling for pre-equalization-based communication schemes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support Rnn and LLR scaling for pre-equalization-based communication schemes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Some UEs 115 may be XR devices that support XR data communications. XR data may include virtual reality (VR), augmented reality (AR), or mixed reality (MR) data. In some examples, transmissions to an XR device may be downlink or sidelink transmissions from a companion device (e.g., a UE 115), which may include video frame data transmissions for projection to a user of the XR device.

Techniques described herein may enable a UE 115 to perform Rnn estimation, which may reduce processing complexity, and power consumption by an XR device. For example, the UE 115 may transmit a first set of reference signals (e.g., without applying a pre-equalization matrix) to the XR device. The XR device may sample the reference signals and perform a quantization to generate a set of quantized samples of a channel between the UE 115 and the XR device. The XR device may transmit an indication of the set of quantized samples of the channel such that the UE 115 may perform channel estimations and determine an Rnn matrix. The UE 115 may use the Rnn matrix to generate a pre-equalization matrix. In some examples, to prevent corruption due to momentary interference, the UE 115 may generate the pre-equalization matrix by performing an averaging or filtering of multiple Rnn matrices generated from multiple sets of quantized samples of the channel.

The described techniques may enable the XR device to perform LLR scaling estimation. For example, the UE 115 may transmit a second set of pre-equalized reference signals (e.g., using the pre-equalization matrix) to the XR device, which the XR device may use to estimate one or more LLR scaling coefficients. The XR device may use the one or more LLR scaling coefficients to decode one or more transmissions from the UE 115. In some examples, the XR device may transmit one or more capability messages indicating a capability of the XR device to perform whitening, LLR scaling estimation, or both. The UE 115 may transmit an indication of the LLR scaling coefficients to the XR device based on the capability of the XR device to perform LLR scaling estimation. The UE 115 may in some cases apply whitening to the one or more transmissions (e.g., to account for momentary interference), and may indicate a whitening matrix to the XR device for the XR device to apply to the one or more transmissions.

Figure 2:
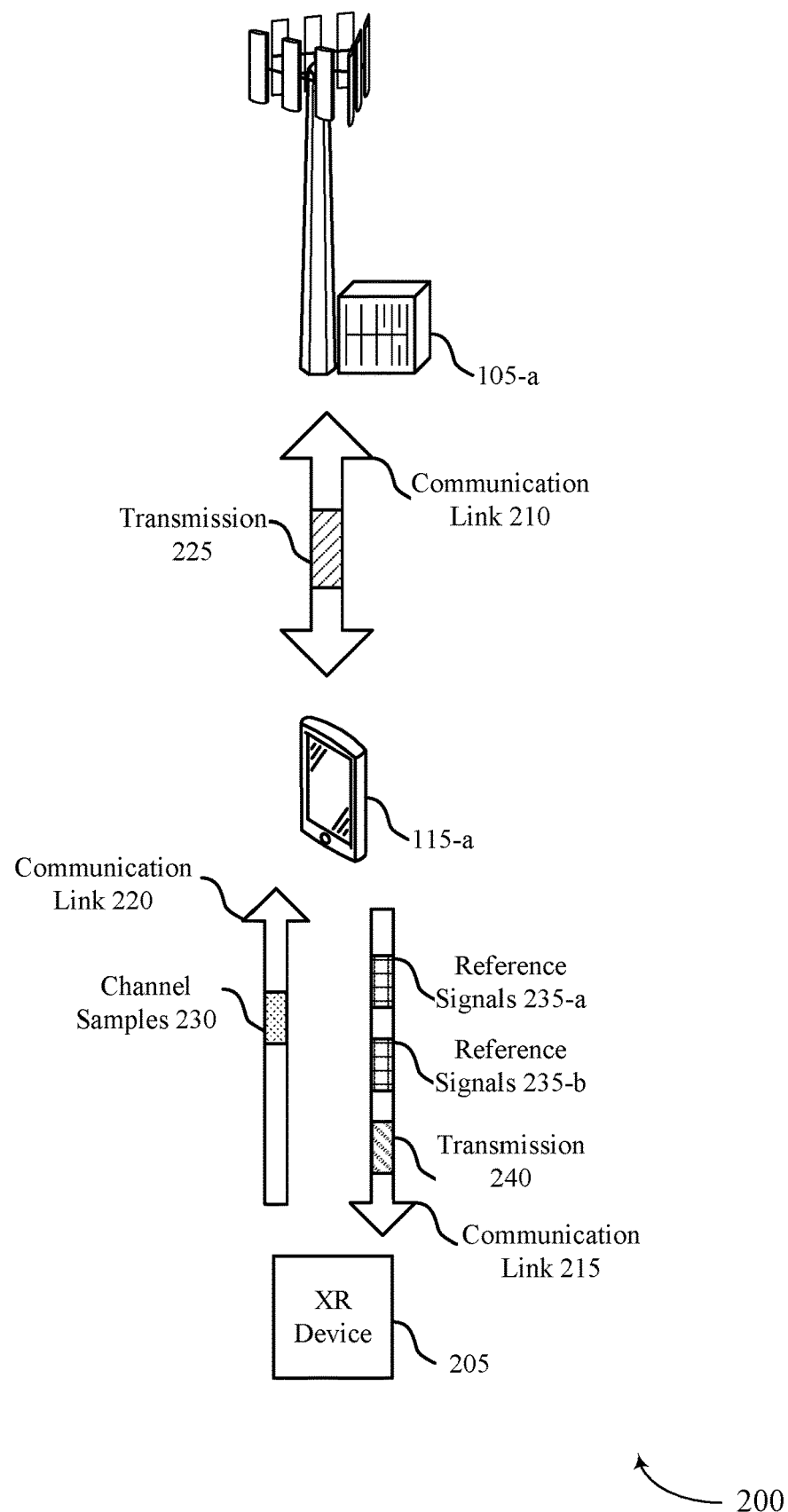
FIG. 2 shows an example of a wireless communications system that supports Rnn and LLR scaling for pre-equalization-based communication schemes in accordance with one or more aspects of the present disclosure.

FIG. 2 shows an example of a wireless communications system 200 that supports Rnn and LLR scaling for pre-equalization-based communication schemes in accordance with one or more aspects of the present disclosure. The wireless communications system 200 may implement or may be implemented by aspects of the wireless communications system 100. For example, the wireless communications system 200 may include a UE 115 (e.g., a UE 115-a and an XR device 205) and a network entity 105 (e.g., a network entity 105-a), which may be examples of the corresponding devices as described with reference to FIG. 1.

In some wireless communications systems, a UE 115-a may communicate with a network entity 105-a via a communication link 210. For example, the UE 115-a may receive downlink transmissions 225 from the network entity 105-a and transmit uplink transmissions 225 to the network entity 105-a via the communication link 210. In some examples, the communication link 210 may be an uplink or downlink channel (e.g., a 5G uplink or downlink channel). The UE 115-a may communicate data with an edge device (e.g., a cloud server) via the network entity 105-a. The UE 115-a may, additionally, or alternatively, communicate with an XR device 205 (XR glasses, goggles, etc.) via a communication link 215 and a communication link 220. For example, the UE 115-a may receive transmissions from the XR device 205 via the communication link 220, and may transmit transmissions to the XR device 205 via the communication link 215. The communication link 220 and the communication link 215 may be examples of sidelink communications links such as 5G sidelink channels, Wi-Fi links, Bluetooth communication links, P2P or D2D links, or any other communications links capable of supporting communications between UE 115-a and XR device 205.

In some examples, the XR device 205 may have weight, processing, power consumption, or heat dissipation constraints or limitations (e.g., to allow for long-time or on-the-go use by a user of the XR device 205). For example, the XR device 205 may have a weight similar to non-XR glasses (e.g., about 30-40 grams), and may accordingly include light weight components, such as light weight batteries. Further, a heat dissipation ability of the XR device 205 may be proportional to a surface size of the XR device 205. Thus, the XR device may have a relatively smaller heat dissipation ability as compared to other UEs 115, which may have a larger surface size or area than the XR device 205. In some examples, a power consumption limit associated with the heat dissipation ability of the XR device 205 may be smaller than for the other UEs 115 (e.g., a limit of between 1.5 and 3 Watts). Accordingly, to reduce heat generation and power consumption, the XR device 205 may operate with a limited processing complexity, which may allow for a lighter weight XR device 205 and a longer battery lifetime.

However, some XR devices 205 (e.g., higher form factor head mounted device (HMD) XR devices 205) may support many XR applications, and may be used for specific applications (e.g., static and short time usage scenarios). That is, HMD devices may allow for higher processing complexity, but may be inconvenient for longer time usage or mobile scenarios.

Accordingly, to allow for reduced processing complexity associated with smaller and lighter weight XR devices 205, some XR-related processing may be shifted to (performed by) a companion device such as the UE 115-a, which may be referred to as a split XR approach. In some split XR approaches, the UE 115-a may perform rendering-related processes (e.g., video rendering), while the XR device 205 may include processing components for different edge-to-edge (E2E) considerations (e.g., photo-to-motion latency considerations, XR to companion device wireless link capacity, communication link power consumption for long range links). Thus, the power consumption involved in such split XR approaches may exceed the power consumption limit of the XR device 205 even in less demanding or lower complexity scenarios. Further, such split XR approaches may not be capable of supporting demanding or premium XR applications (e.g., greater than 120 frames per second (fps), 8K high-resolution video formats).

For example, some split XR approaches may use long range communication links over a licensed spectrum shared with multiple served XR users. However, such approaches may involve tight scheduling and staggering, and may result in a limited capacity per XR user. Accordingly, the XR device 205 may include one or more sensors which may perform local data processing (e.g., to reduce a volume of data such as 6 degree of freedom (DOF) tracking, eye tracking for field of view (FOV) derivation, etc. transmitted to the companion device). Further, additional data transmitted from the XR device 205 to the companion device (e.g., sensor and camera data) and from the companion device to the XR device 205 (e.g., rendered video data) may be compressed with a high compression factor to achieve a link capacity threshold per XR user. Such data pre-processing and video compression with a sufficiently high compression factor (e.g., high profile of H264) may involve a high processing complexity for an encoding device. Further, such techniques may involve a high double data rate (DDR) usage for transmission and reception path video processing, which may result in increased power consumption by the XR device 205. Additionally, to account for latencies such as photon-to-motion latency and network entity-based split latencies, the XR device 205 may apply asynchronous time wrapping (ATW) as part of receiver-side processing for last moment image alignment with a pose associated with the user. Accordingly, such techniques may result in power consumption which exceeds the power consumption limit (e.g., greater than 3 Watts).

Some other split XR approaches may use processing offloading techniques. For example, the XR device 205 may have a tethering link (e.g., the communication link 215, the communication link 220) with the companion device (e.g., the UE 115-a) which may be shorter than the long range communication links. Such approaches may involve a similar processing load as the long range communication link techniques, but may reduce modem-related power consumption as compared to the long range communication link techniques. However, such approaches may result in power consumption which exceeds the power consumption limit.

Some techniques may allow for more processing offloading from the XR device 205 to the UE 115-a (e.g., and the network entity 105-a) such that the XR device 205 may operate as a mostly input/output (I/O) device. For example, the XR device 205 may share local sensor information with the UE 115-a without performing pre-processing, and may receive rendered video from the UE 115-a to be displayed to the user without any post-processing. Such techniques may allow for the XR device 205 to significantly reduce power consumption as compared to other split XR approaches (e.g., by about 50%), which may allow for lower power and lighter weight XR devices 205 (e.g., which may achieve target XR characteristics or key performance indicator (KPI) thresholds).

To allow for the XR device 205 to operate as a mostly I/O device, as described herein, complexity associated with the XR device 205 transmitting or receiving signaling (e.g., including PHY layer or modem related complexity) may be shifted to (performed by) the UE 115-a. In some examples, the modem complexity may result from receiver-side processing. Accordingly, receiver PHY modules at the XR device 205 may be effectively shifted to the transmission side of the communication link 215 at the UE 115-a (e.g., and thus degenerated at the XR device 205). Thus, the XR device 205 may operate with reduced processing by the XR mode, and may accordingly achieve a reduced processing complexity and power consumption. To perform such techniques, the UE 115-a may have a quasi-continuous channel state information (CSI) knowledge for the channel (e.g., with or without channel reciprocity), which may be achieved using transmission schemes such as low latency time division duplex (TDD), full duplex, or subband full duplex (SBFD). In some examples, full duplex schemes may be implemented for low power, short range communication links such as the communication link 215 and the communication link 220 relatively easier than for ultra-wideband (UWB) links.

In some examples, the XR device 205 may perform receiver-side equalization to account for interference and poor channel quality, which may increase modem related complexity for the XR device 205. Accordingly, to further reduce complexity for the XR device 205, the UE 115-a may perform processing associated with receiver-side equalization. That is, the UE 115-a may apply a transmission-side pre-equalization to account for the interference (e.g., instead of post-equalization applied by the XR device 205). Such techniques may result in approximately the same (e.g., or improved) performance as receiver-side equalization.

In some examples, if channel reciprocity holds (e.g., for single frequency full duplex (SFFD) and TDD communications), the UE 115-a may perform channel estimation for both directions of the channel (e.g., from the UE 115-a to the XR device 205 and from the XR device 205 to the UE 115-a) by measuring reference signals transmitted by the XR device 205 to the UE 115-a. In some other examples, if channel reciprocity does not hold (e.g., for SBFD or FDD communications), the XR device 205 may signal or indicate CSI information to the UE 115-a. That is, to support the UE 115-a performing pre-equalization, the UE 115-a may acquire Rnn from the XR device 205 for use in a pre-equalization process.

As described herein, to reduce processing performed by the XR device, the UE 115-a may perform Rnn acquisition. In some implementations, to allow for the UE 115-a to acquire the Rnn from the XR device 205, the XR device 205 may sample a set of reference signals 235-a (e.g., downlink or sidelink reference signals) from the UE 115-a and generate a set of quantized channel samples 230. The UE 115-a may receive the quantized channel samples 230 and may accordingly estimate CSI and Rnn as part of a channel estimation (CHEST) procedure using the quantized channel samples. In some examples, the UE 115-a may estimate Rnn according to Equation 1 below:

$$Rnn = E\{\tilde{n}\tilde{n}^+\} \quad (1)$$

As described with reference to Equation 1, ñ may be defined as ñ=y−Ĥd, where Ĥ may be the estimated channel, d may be the known transmit signal (e.g., the set of reference signals), and y may be the signal received by the XR device 205 in time and frequency resources reserved for the set of reference signals.

The UE 115-a may use the estimated CSI to generate a pre-equalization matrix to apply to one or more transmissions 240 to the XR device 205. For example, the UE 115-a may use the Rnn estimated using the CSI for minimum mean squared error (MMSE)-based pre-equalization. That is, to apply MMSE-based pre-equalization, the UE 115-a may calculate the pre-equalization matrix P according to Equation 2 below:

$$P = H^+(HH^+ + I^*\text{trace}(Rnn)/P_T)^{-1} \quad (2)$$

As described with reference to Equation 2, H may be defined as the estimated channel, I may be the identity matrix, and $P_T$ may be a total power used by the UE 115-a to transmit the set of reference signals. In some examples, the equation used to calculate the pre-equalization matrix may additionally include a power scaling term. The UE 115-a may use a trace of a matrix describing the estimated Rnn to generate the pre-equalization matrix, and may accordingly use diagonal elements of the Rnn matrix (e.g., rather than the entire Rnn matrix). In some examples, the UE 115-a may use the full Rnn matrix (e.g., diagonal and off-diagonal elements). For example, if the XR device 205 has a capability to perform whitening, the UE 115-a may account for Rnn by adding whitening equivalent to the channel response used for pre-equalization. In such examples, the UE 115-a may transmit, to the XR device 205, an indication of a whitening matrix for the XR device 205 to apply to the channel.

In some examples, the XR device 205 may decode one or more transmission 240 from the UE 115-a using one or more LLR values. A reliability of communication associated with the one or more transmissions 240 may be larger for some LLR values (e.g., values relatively closer to 0 or 1) than for some other LLR values (e.g., values closer to 0.5). Accordingly, the XR device 205 may use one or more LLR scaling coefficients to improve an LLR associated with the one or more transmissions 240 (e.g., such that the LLR is closer to 0 or to 1), which may improve a reliability of communications.

In such examples, the XR device 205 may use noise variance (e.g., Rnn) to estimate one or more LLR scaling values (e.g., coefficients). For example, the XR device 205 may use diagonal elements of the Rnn matrix to derive a post processing error covariance $\Sigma_e$. The XR device 205 may calculate $\Sigma_e$ according to Equation 3 below:

$$\Sigma_e = (WHP-I)(WHP-I)^H + tr\{P^H P\} WRnnW^H \quad (3)$$

As described with reference to Equation 3, P may be the transmission-side pre-equalization matrix, H may be the estimated channel, W may be an un-biasing matrix given by $$W = \text{diag}\left\{\left[\frac{1}{\{HP\}_{11}}, \frac{1}{\{HP\}_{22}}, \ldots, \frac{1}{\{HP\}_{NN}}\right]\right\}$$

(e.g., for transmission-side MMSE for N×N full-rank MIMO communications). In some examples, the un-biasing matrix may be applied at the receiver side (e.g., by the XR device 205) rather than at the transmitter side. The XR device 205 may use de to estimate LLR scaling values in an LLR calculation process. For example, a weighting of per-bit log likelihood metrics may be set according to a main diagonal of $\Sigma_e$, which may be defined as $$\frac{1}{[\Sigma_e]_{ii}}.$$

However, in some cases (e.g., when the UE 115-a performs CHEST and Rnn estimation), the XR device 205 may not have access to the noise variance, and may therefore use a different technique to generate the one or more LLR scaling values. Accordingly, the UE 115-a may transmit a set of reference signals 235-b to the XR device 205 such that the XR device 205 may measure the reference signals 235-b and generate the one or more LLR scaling coefficients. In some examples, the UE 115-a may equalize the reference signals 235-b using the pre-equalization matrix. The reference signals 235-b may be reference signals which are dedicated for LLR scaling estimation. In some examples, the XR device 205 may transmit a capability message to the UE 115-a indicating a capability of the XR device 205 to perform LLR scaling estimation. In such examples, if the XR device 205 does not have a capability to perform LLR scaling estimation, the UE 115-a may estimate the one or more LLR scaling coefficients and may transmit the one or more LLR scaling values to the XR device 205.

In some examples, an Rnn matrix used to calculate the pre-equalization matrix and an Rnn matrix used to calculate the LLR scaling values may not be the same. For example, the UE 115-a may use an Rnn matrix, which accounts for receiver-side thermal noise and stationary interference (e.g., and not momentary interference), to calculate the pre-equalization matrix. That is, the Rnn matrix for calculating the pre-equalization matrix may be determined prior to a corresponding pre-equalized downlink transmission. If such an Rnn matrix includes momentary interference (e.g., interference which exists in the channel during the CHEST procedure but not during the corresponding pre-equalized downlink transmission), the pre-equalization matrix may be corrupted. Accordingly, the UE 115-a may use an Rnn matrix which does not include momentary interference for estimating the pre-equalization matrix (e.g., by performing a filtering or averaging of estimated Rnn). However, an Rnn matrix used to calculate the LLR scaling values (e.g., the matrix with diagonal terms used to determine de) may account for momentary interference, and may accordingly be different from the Rnn matrix for calculating the pre-equalization matrix.

The techniques described herein may allow for the XR device 205 to operate with reduced processing complexity and power consumption by offloading equalization procedures and Rnn estimation to the UE 115-a. Accordingly, the XR device 205 may operate more similarly to an I/O device and may have a smaller size, a lighter weight, and simplified modem hardware (e.g., as compared to an HMD XR device). Further, the described techniques for pre-equalized transmission schemes may allow for increased robustness for interference and channel aging effects as compared to UWB transmission schemes. In some examples (e.g., for OFDM waveforms), the described techniques may further allow for reduced overhead associated with LLR scaling estimation by the UE 115-a.

Figure 3:
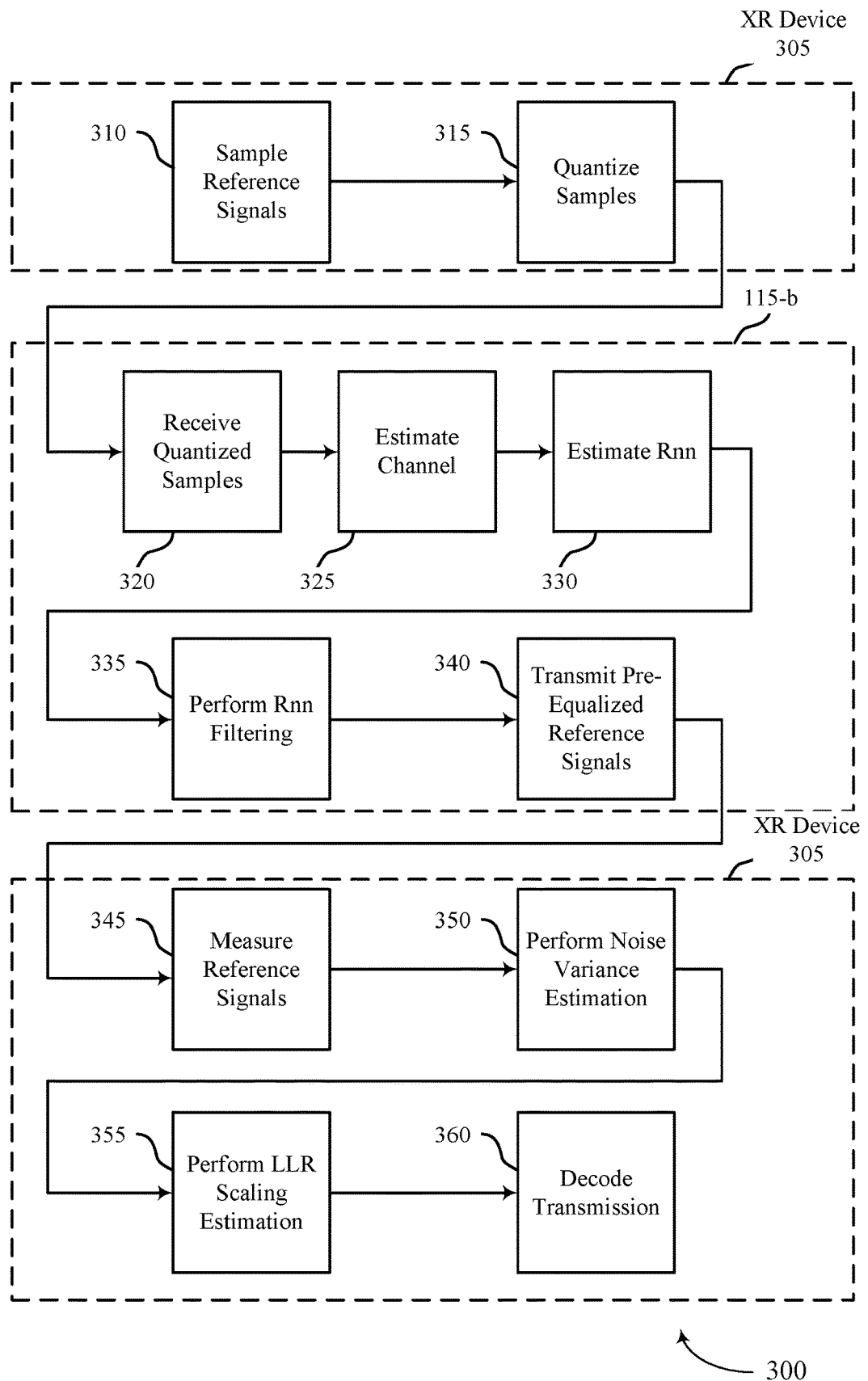
FIG. 3 shows an example of a flowchart that supports Rnn and LLR scaling for pre-equalization-based communication schemes in accordance with one or more aspects of the present disclosure.

FIG. 3 shows an example of a flowchart 300 that supports Rnn and LLR scaling for pre-equalization-based communication schemes in accordance with one or more aspects of the present disclosure. The flowchart 300 may implement or may be implemented by aspects of the wireless communications system 100 or the wireless communications system 200. For example, the flowchart 300 may include a UE 115 (e.g., a UE 115-b and an XR device 305), which may be examples of the corresponding devices as described with reference to FIG. 1.

In some implementations, an XR device 305 and a companion device, such as a UE 115-b, may perform an initial acquisition procedure to establish a connection via a channel between the XR device 305 and the UE 115-b. At 310, the XR device 305 may receive and sample a set of reference signals transmitted by the UE 115-b. The set of reference signals may be, for example, non-pre-equalized reference signals dedicated for channel estimation (e.g., to capture a clean Rnn estimation and channel estimation for scenarios without channel reciprocity). At 315, the XR device 305 may quantize measurements of the set of reference signals and may transmit, to the UE 115-b, a set of quantized samples of the channel between the XR device 305 and the UE 115-b.

At 320, the UE 115-b may receive the quantized channel samples from the XR device 305. At 325, the UE 115-b may use the quantized channel samples to determine a channel estimation as part of a channel estimation procedure. At 330, the UE 115-b may use the channel estimation to estimate an Rnn matrix for the UE 115-b to use in generating a pre-equalization matrix. For example, the UE 115-b may estimate the Rnn matrix using procedures described in further detail with reference to FIG. 2. In some examples, because the set of reference signals may not be pre-equalized, the estimated Rnn matrix may not account for residual equalization error which may be introduced (e.g., intentionally introduced) by MMSE-based criteria to minimize a mean square error (MSE) of the pre-equalization matrix.

In some examples (e.g., if the XR device 305 can perform whitening), the UE 115-b may use the full Rnn matrix, including diagonal and off-diagonal elements, to generate the pre-equalization matrix. To reduce or prevent corruption resulting from momentary interference, at 335, the UE 115-b may perform a filtering (e.g., an averaging) of multiple channel samples or multiple Rnn matrices and may generate a stationary Rnn matrix which accounts for long term channel statistics (e.g., stationary interference and thermal noise).

To account for momentary interference, the XR device 305 may perform whitening. For example, if the XR device 305 indicates to the UE 115-b that the XR device 305 is capable of performing whitening, the UE 115-b may indicate whitening matrices to the XR device 305 after each pre-equalization update event or refresh (e.g., every 8 slots or every millisecond). The XR device 305 may accordingly perform frequency-selective whitening by applying the whitening matrices to the channel.

At 340, the UE 115-b may generate the pre-equalization matrix using the Rnn matrix (e.g., the stationary Rnn matrix) and may transmit a set of pre-equalized reference signals to the XR device 305. The pre-equalized reference signals may be, for example, reference signals dedicated for LLR scaling estimation. The UE 115-b may determine a resource allocation for the set of pre-equalized reference signals by selecting one of a set of pre-defined pilot grid options. For example, each of the set of pre-defined pilot grids may include time or frequency resources dedicated for transmission of the pre-equalized reference signals. The reference signal resource allocation may follow a time-domain grid (e.g., for DFT-S-OFDM waveform reference signals), or may follow a two-dimensional frequency-domain/time-domain grid (e.g., for OFDM waveform downlink or sidelink reference signals). The UE 115-b may select a time or frequency density of the resource allocation based on an operational SNR, a signal-to-noise-plus-interference ratio (SNIR), a channel quality, or interference characteristics of the channel determined based on the quantized channel samples.

The UE 115-b may further select the resource allocation based on a capability of the XR device 305 to perform LLR scaling estimation. For example, the XR device 305 may transmit a capability message to the UE 115-b indicating a capability of the XR device to perform LLR scaling estimation. The UE 115-b may transmit the pre-equalized reference signals, for example, if the XR device 305 is capable of performing LLR scaling estimation.

The UE 115-b may indicate or configure the resource allocation to the XR device 305 (e.g., semi-statically via an RRC message or dynamically via a synchronous configuration signaling option such as a MAC control element (MAC-CE), downlink control information (DCI), or sidelink control information (SCI)). For example, based on the capability message, the UE 115-b may allocate resources for LLR scaling estimation reference signals and may transmit the pre-equalized reference signals for the XR device 305 to perform LLR scaling estimation.

At 345, the XR device 305 may receive and measure the pre-equalized reference signals. In some examples, the selected resource allocation for the pre-equalized reference signals may allow an improved robustness to momentary or asynchronous interference (e.g., interference which may partially or fully overlap with downlink or sidelink data messages received by the XR device 305). For example, at 350, the XR device 305 may perform post-processing noise variance estimation (e.g., estimation of a post-processing error vector magnitude (EVM)) for the downlink or sidelink data messages. Such post-processing may allow for the XR device 305 to perform LLR scaling estimation adaptively (e.g., to account for momentary or instant SINR).

At 355, the XR device 305 may perform LLR scaling estimation using the measurements of the pre-equalized reference signals. For example, if the XR device 305 is capable of performing LLR scaling estimation, the XR device 305 may estimate one or more LLR scaling coefficients as described in further detail with reference to FIG. 2. In some examples (e.g., for a DFT-s-OFDM waveform), a quantity L of the one or more LLR scaling coefficients may be equal to a quantity of layers used in communications between the XR device 305 and the UE 115-b. In some examples (e.g., for an OFDM waveform), a quantity of the one or more LLR scaling coefficients may be defined as K*L, where L may be the quantity of layers and K may be a quantity of resource elements (REs) used in communications between the XR device 305 and the UE 115-b.

In some examples (e.g., if the XR device 305 does not support the capability to perform LRR scaling estimation), the UE 115-b may indicate the one or more LLR scaling coefficients to the XR device 305. For example, the UE 115-b may calculate the one or more LLR scaling coefficients. In some examples (e.g., for a DFT-S-OFDM waveform), the UE 115-b may calculate the L LLR scaling coefficients by calculating a harmonic mean of an SNR across each RE for each layer. In such examples, due to an averaging effect caused by DFT from the frequency domain to the time domain, the UE 115-b may not calculate an LLR scaling coefficient for each RE per layer. In some examples (e.g., for an OFDM waveform), the UE 115-b may calculate the K*L LLR scaling coefficients. In some examples, the UE 115-b may perform an averaging over one or more frequency ranges to reduce the quantity of LLR scaling coefficients (e.g., and accordingly reduce overhead associated with LLR scaling estimation).

The UE 115-b may indicate the one or more LLR scaling coefficients each pre-equalization update or refresh (e.g., every 8 slots or every millisecond). For example, the UE 115-b may indicate the one or more LLR scaling coefficients in a message such as a physical downlink shared channel (PDSCH) message, a physical downlink control channel (PDCCH) message, a physical sidelink shared channel (PSSCH) message, or a physical sidelink control channel (PSCCH) message, in an indication similar to an SCI. In some examples, the UE 115-b may transmit the LLR scaling coefficient indication with a robust modulation and coding scheme (MCS) option (e.g., a different MCS than an MCS used for data messages from the UE 115-b to the XR device 305). Accordingly, the XR device 305 may decode the control information indicating the LLR scaling coefficients without using a proper LLR scaling.

However, in some examples, LLR scaling coefficients estimated by the UE 115-b may not account for instant or momentary interference. Further, the LLR scaling coefficients estimated by the UE 115-b may not account for a pre-equalization mismatch related to channel aging, channel mismatches, or physical resource group (PRG)-based pre-coding mismatches.

Accordingly, in some examples (e.g., for DFT-S-OFDM waveforms), due to relatively low overhead associated with LLR scaling estimation (e.g., as compared to OFDM waveforms), the UE 115-b and the XR device 305 may both estimate LLR scaling coefficients. Such a hybrid LLR scaling estimation approach may increase robustness by accounting for momentary interference and pre-equalization mismatches while decreasing a processing complexity of the XR device 305. In such examples, the XR device 305 may combine the estimated LLR scaling coefficients.

At 360, the XR device 305 may receive and decode one or more transmissions from the UE 115-b. For example, the XR device 305 may decode the one or more transmissions using the one or more LLR scaling coefficients (e.g., estimated by the XR device 305, estimated by the UE 115-b, or both). The UE 115-b may equalize the one or more transmissions using the pre-equalization matrix.

Figure 4:
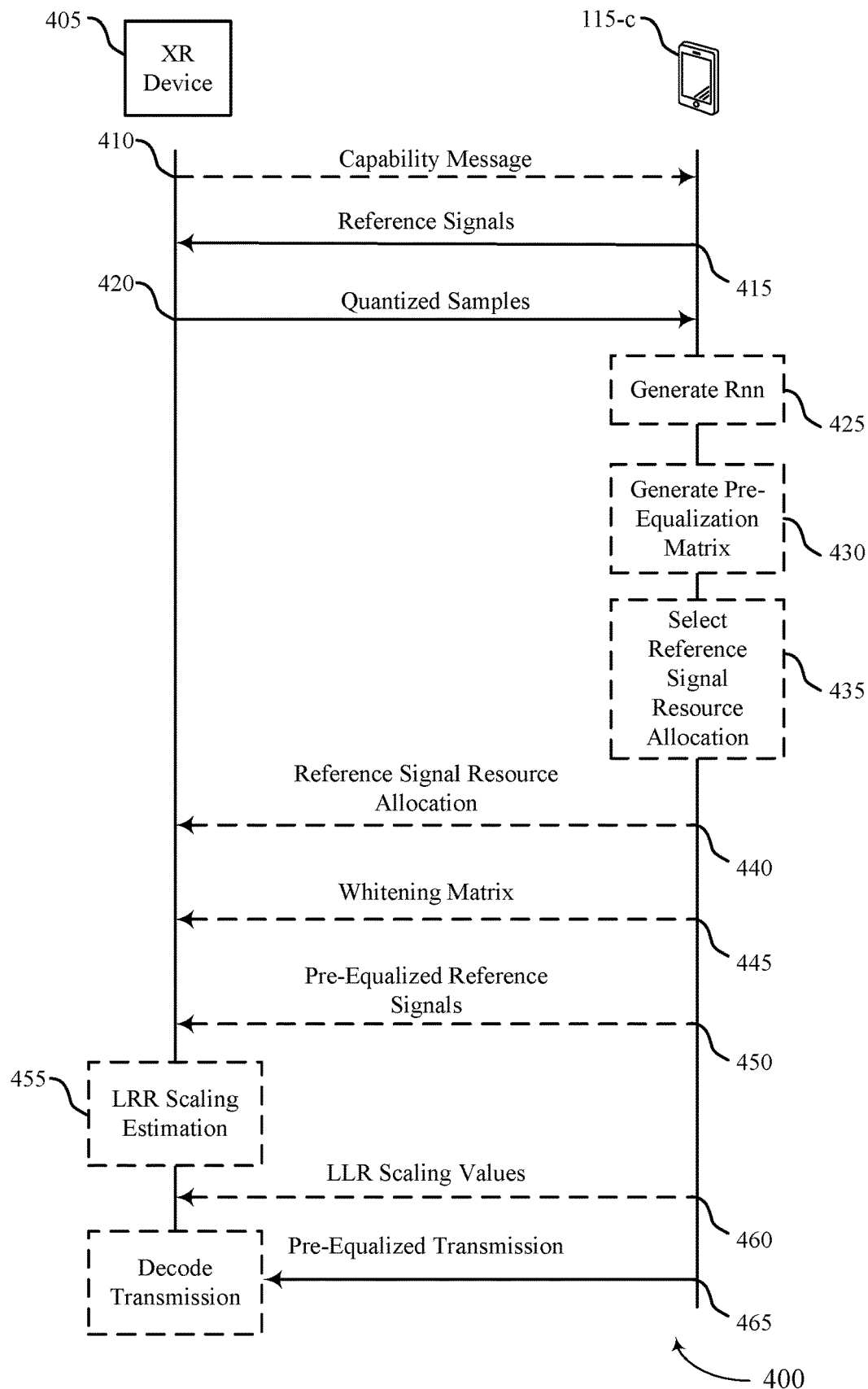
FIG. 4 shows an example of a process flow that supports Rnn and LLR scaling for pre-equalization-based communication schemes in accordance with one or more aspects of the present disclosure.

FIG. 4 shows an example of a process flow 400 that supports Rnn and LLR scaling for pre-equalization-based communication schemes in accordance with one or more aspects of the present disclosure. The process flow 400 may implement or may be implemented by aspects of the wireless communications system 100, the wireless communications system 200, or the flowchart 300. For example, the process flow 400 may include a UE 115 (e.g., a UE 115-c and an XR device 405), which may be examples of the corresponding devices as described with reference to FIG. 1.

In the following description of the process flow 400, the operations between the UE 115-c and the XR device 405 may be transmitted in a different order than the example order shown. Some operations may also be omitted from the process flow 400, and other operations may be added to the process flow 400. Further, although some operations or signaling may be shown to occur at different times for discussion purposes, these operations may actually occur at the same time.

In some examples, at 410, the XR device 405 may transmit, to the UE 115-c, one or more capability messages. The one or more capability messages may indicate a capability of the XR device 405 to perform whitening, a capability of the XR device 405 to perform LLR scaling estimation, or both.

At 415, the UE 115-c may transmit, to the XR device, a set of channel estimation reference signals dedicated for channel estimation of a channel between the UE 115-c and the XR device 405. In some examples, the UE 115-c may transmit the set of channel estimation reference signals without applying pre-equalization. The XR device 405 may receive and measure the set of channel estimation reference signals.

At 420, the XR device may transmit, to the UE 115-c, a set of quantized samples of the channel such that the UE 115-c may perform channel estimation and Rnn estimation. For example, the XR device may perform one or more measurements on the set of channel estimation reference signals and may generate the set of quantized samples of the channel between the XR device 405 and the UE 115-c.

In some examples, at 425, the UE 115-c may generate Rnn. For example, the UE 115-c may generate the Rnn based on receiving the set of quantized samples of the channel. The UE 115-c may receive multiple samples of the channel (e.g., including the set of quantized samples of the channel) and generate a plurality of matrices associated with Rnn. The UE 115-c may perform a filtering (e.g., an averaging) on the plurality of matrices to generate the Rnn.

In some examples, at 430, the UE 115-c may generate a pre-equalization matrix. In some examples (e.g., if the XR device 405 cannot perform whitening), the UE 115-c may generate the pre-equalization matrix using a trace (e.g., diagonal elements) of a matrix associated with the Rnn. In some examples (e.g., if the XR device 405 can perform whitening), the UE 115-c may generate the pre-equalization matrix using all elements of the matrix associated with the Rnn.

In some examples, at 435, the UE 115-c may select a resource allocation for transmitting a set of pre-equalized reference signals. In some examples, the set of pre-equalized reference signals may be dedicated for estimating LRR scaling coefficients. The UE 115-c may select the resource allocation based on the capability of the XR device 405 to perform LLR scaling estimation and on one or more channel characteristics (e.g., a SNR, a SNIR, an amount of interference, a channel quality, etc.). The UE 115-c may select the resource allocation from a plurality of configured (e.g., pre-configured) resource allocations which the UE 115-c may use for transmitting the set of pre-equalized reference signals. In some examples, at 440, the UE 115-c may transmit, to the XR device 405, an indication of a configuration for the selected resource allocation.

In some examples, at 445, the UE 115-c may transmit, to the XR device 405, a message indicating one or more whitening matrices for the XR device 405 to apply to the channel. For example, the UE 115-c may transmit the message based on the capability of the XR device 405 to perform whitening. The XR device 405 may accordingly apply the one or more whitening matrices to the channel.

At 450, the UE 115-c may transmit, to the XR device 405, the set of pre-equalized reference signals. For example, the UE 115-c may transmit the set of pre-equalized reference signals via the selected resource allocation. The UE 115-c may pre-equalize the set of pre-equalized reference signals using the generated pre-equalization matrix.

In some examples, at 455, the XR device 405 may perform LLR scaling estimation. For example, (e.g., if the XR device 405 has the capability to perform LLR scaling estimation), the XR device 405 may generate one or more LLR scaling values (e.g., coefficients) based at least in part on receiving the set of pre-equalized reference signals.

In some examples, at 460, the UE 115-c may transmit, to the XR device 405, an indication of one or more LLR scaling values. For example, (e.g., if the XR device 405 does not have the capability to preform LLR scaling estimation), the UE 115-c may calculate the one or more LLR scaling values based on the one or more quantized samples of the channel and transmit the one or more LLR scaling values to the XR device 405. In some examples, if the XR device 405 does not have the capability to perform LLR scaling estimation, the UE 115-c may transmit, to the XR device 405, the indication of one or more LLR scaling values at 460 while not transmitting, to the XR device 405, the set of pre-equalized reference signals at 450. In this way, the resources for transmitting the set of pre-equalized reference signals may be saved.

At 465, the UE 115-c may transmit one or more pre-equalized transmissions to the XR device 405. That is, the one or more pre-equalized transmissions may be pre-equalized based on the pre-equalization matrix. In some examples, the XR device 405 may decode the one or more pre-equalized transmissions from the UE 115-c based on the one or more LLR scaling values. For example, the XR device 405 may decode the one or more transmissions using the one or more estimated LLR scaling values or the one or more LLR scaling values received from the UE 115-c. The UE 115-c may equalize the one or more transmissions using the pre-equalization matrix.

Figure 5:
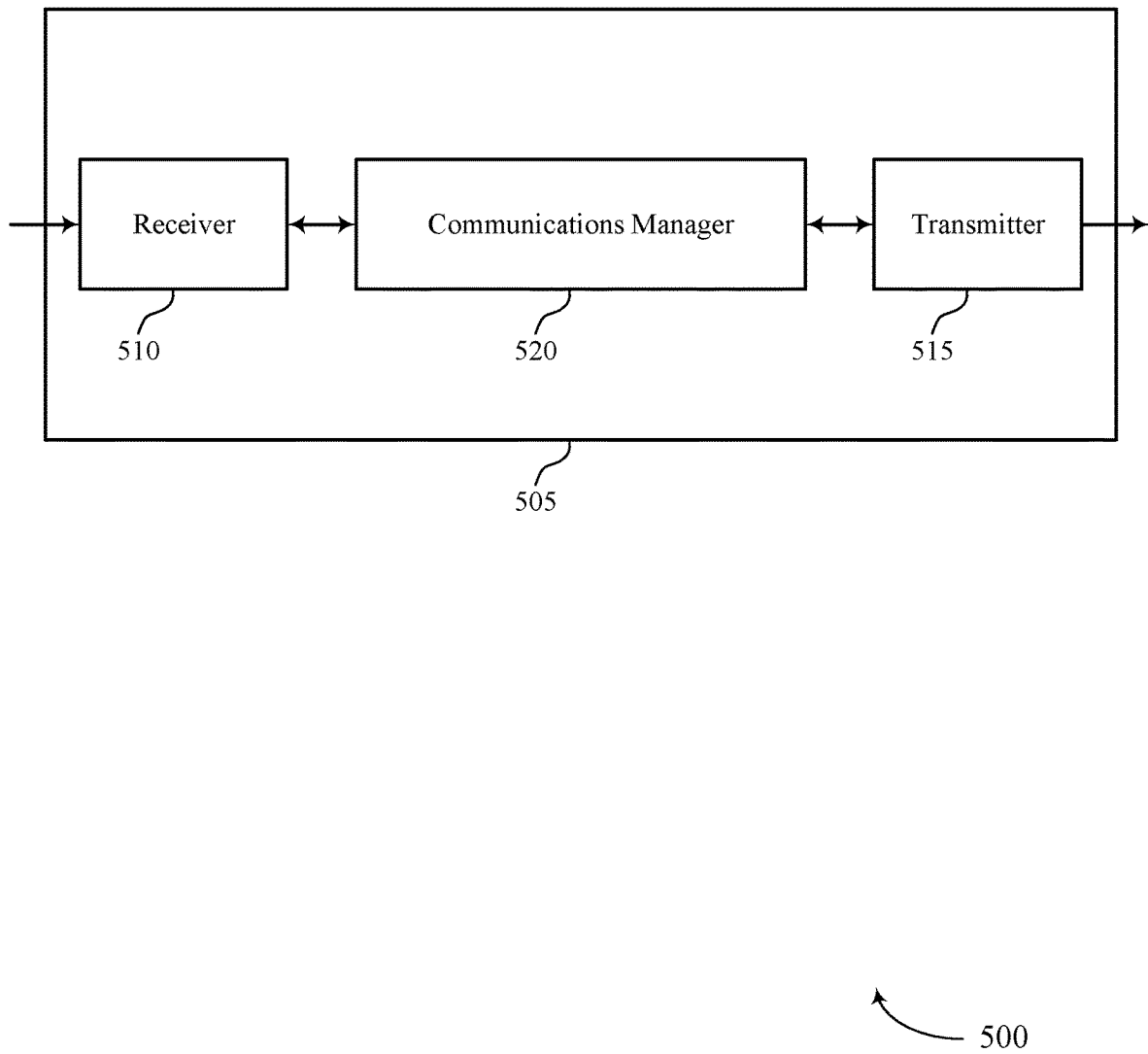
FIGS. 5 and 6 show block diagrams of devices that support Rnn and LLR scaling for pre-equalization-based communication schemes in accordance with one or more aspects of the present disclosure.

FIG. 5 shows a block diagram 500 of a device 505 that supports Rnn and LLR scaling for pre-equalization-based communication schemes in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to Rnn and LLR scaling for pre-equalization-based communication schemes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to Rnn and LLR scaling for pre-equalization-based communication schemes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of Rnn and LLR scaling for pre-equalization-based communication schemes as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for transmitting, to a second UE, a set of channel estimation reference signals dedicated for channel estimation of a channel between the first UE and the second UE. The communications manager 520 is capable of, configured to, or operable to support a means for receiving, from the second UE and in response to the set of channel estimation reference signals, a set of quantized samples of the channel for channel estimation, the set of quantized samples based on the set of channel estimation reference signals. The communications manager 520 is capable of, configured to, or operable to support a means for transmitting, to the second UE, one or more pre-equalized transmissions that are pre-equalized based on a pre-equalization matrix, where the pre-equalization matrix is based on Rnn associated with the set of quantized samples of the channel.

Additionally, or alternatively, the communications manager 520 may support wireless communications in accordance with examples as disclosed herein. For example, the communications manager 520 is capable of, configured to, or operable to support a means for receiving, from a first UE, a set of channel estimation reference signals dedicated for channel estimation of a channel between the second UE and the first UE. The communications manager 520 is capable of, configured to, or operable to support a means for transmitting, to the first UE and in response to the set of channel estimation reference signals, a set of quantized samples of the channel for channel estimation, the set of quantized samples based on the set of channel estimation reference signals. The communications manager 520 is capable of, configured to, or operable to support a means for receiving, from the first UE, one or more pre-equalized transmissions that are pre-equalized based on a pre-equalization matrix, where the pre-equalization matrix is based on Rnn associated with the set of quantized samples of the channel.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for Rnn estimation and LLR scaling estimation, which may allow for reduced processing and reduced power consumption.

Figure 6:
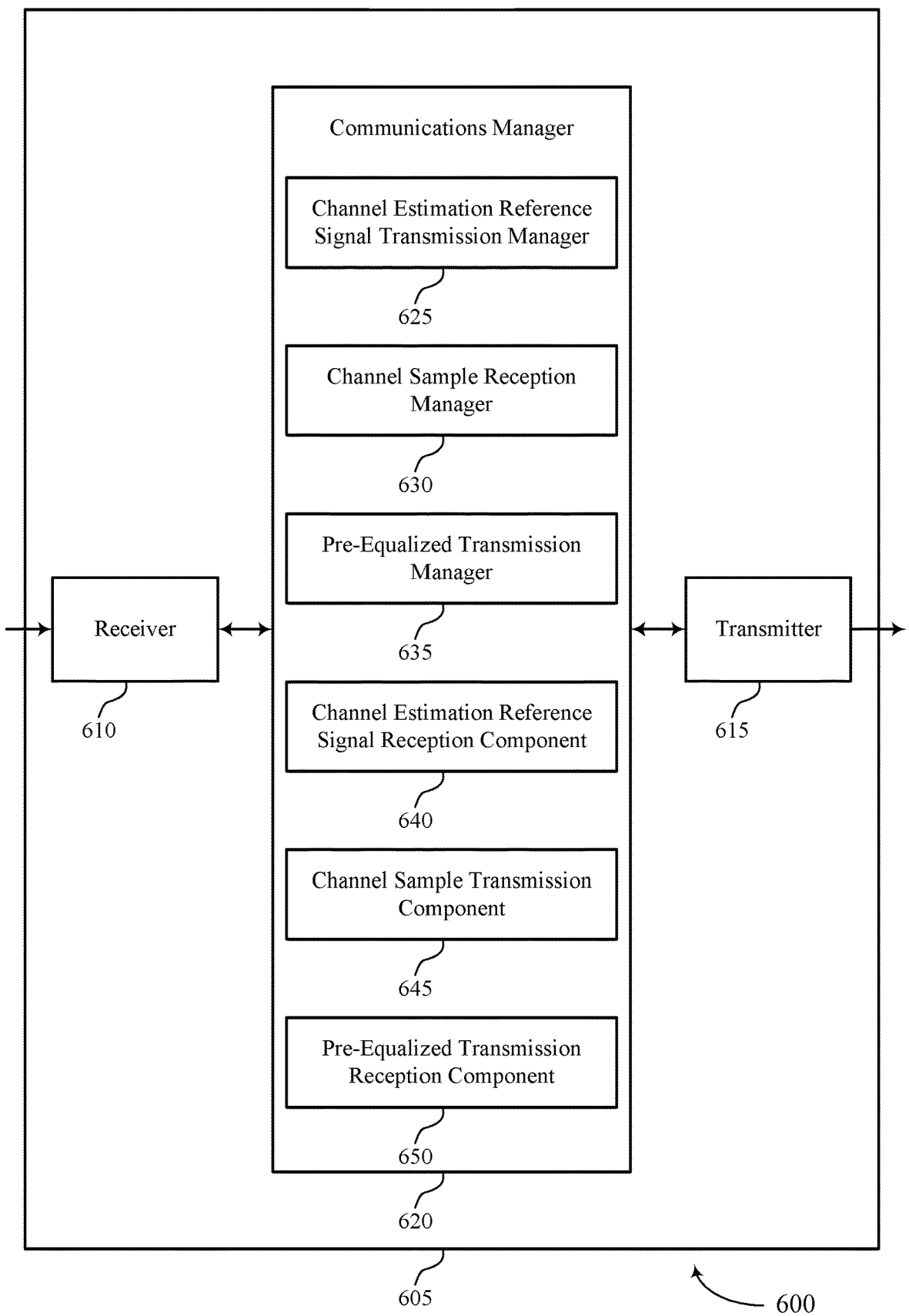

FIG. 6 shows a block diagram 600 of a device 605 that supports Rnn and LLR scaling for pre-equalization-based communication schemes in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to Rnn and LLR scaling for pre-equalization-based communication schemes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to Rnn and LLR scaling for pre-equalization-based communication schemes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of Rnn and LLR scaling for pre-equalization-based communication schemes as described herein. For example, the communications manager 620 may include a channel estimation reference signal transmission manager 625, a channel sample reception manager 630, a pre-equalized transmission manager 635, a channel estimation reference signal reception component 640, a channel sample transmission component 645, a pre-equalized transmission reception component 650, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The channel estimation reference signal transmission manager 625 is capable of, configured to, or operable to support a means for transmitting, to a second UE, a set of channel estimation reference signals dedicated for channel estimation of a channel between the first UE and the second UE. The channel sample reception manager 630 is capable of, configured to, or operable to support a means for receiving, from the second UE and in response to the set of channel estimation reference signals, a set of quantized samples of the channel for channel estimation, the set of quantized samples based on the set of channel estimation reference signals. The pre-equalized transmission manager 635 is capable of, configured to, or operable to support a means for transmitting, to the second UE, one or more pre-equalized transmissions that are pre-equalized based on a pre-equalization matrix, where the pre-equalization matrix is based on Rnn associated with the set of quantized samples of the channel.

Additionally, or alternatively, the communications manager 620 may support wireless communications in accordance with examples as disclosed herein. The channel estimation reference signal reception component 640 is capable of, configured to, or operable to support a means for receiving, from a first UE, a set of channel estimation reference signals dedicated for channel estimation of a channel between the second UE and the first UE. The channel sample transmission component 645 is capable of, configured to, or operable to support a means for transmitting, to the first UE and in response to the set of channel estimation reference signals, a set of quantized samples of the channel for channel estimation, the set of quantized samples based on the set of channel estimation reference signals. The pre-equalized transmission reception component 650 is capable of, configured to, or operable to support a means for receiving, from the first UE, one or more pre-equalized transmissions that are pre-equalized based on a pre-equalization matrix, where the pre-equalization matrix is based on Rnn associated with the set of quantized samples of the channel.

Figure 7:
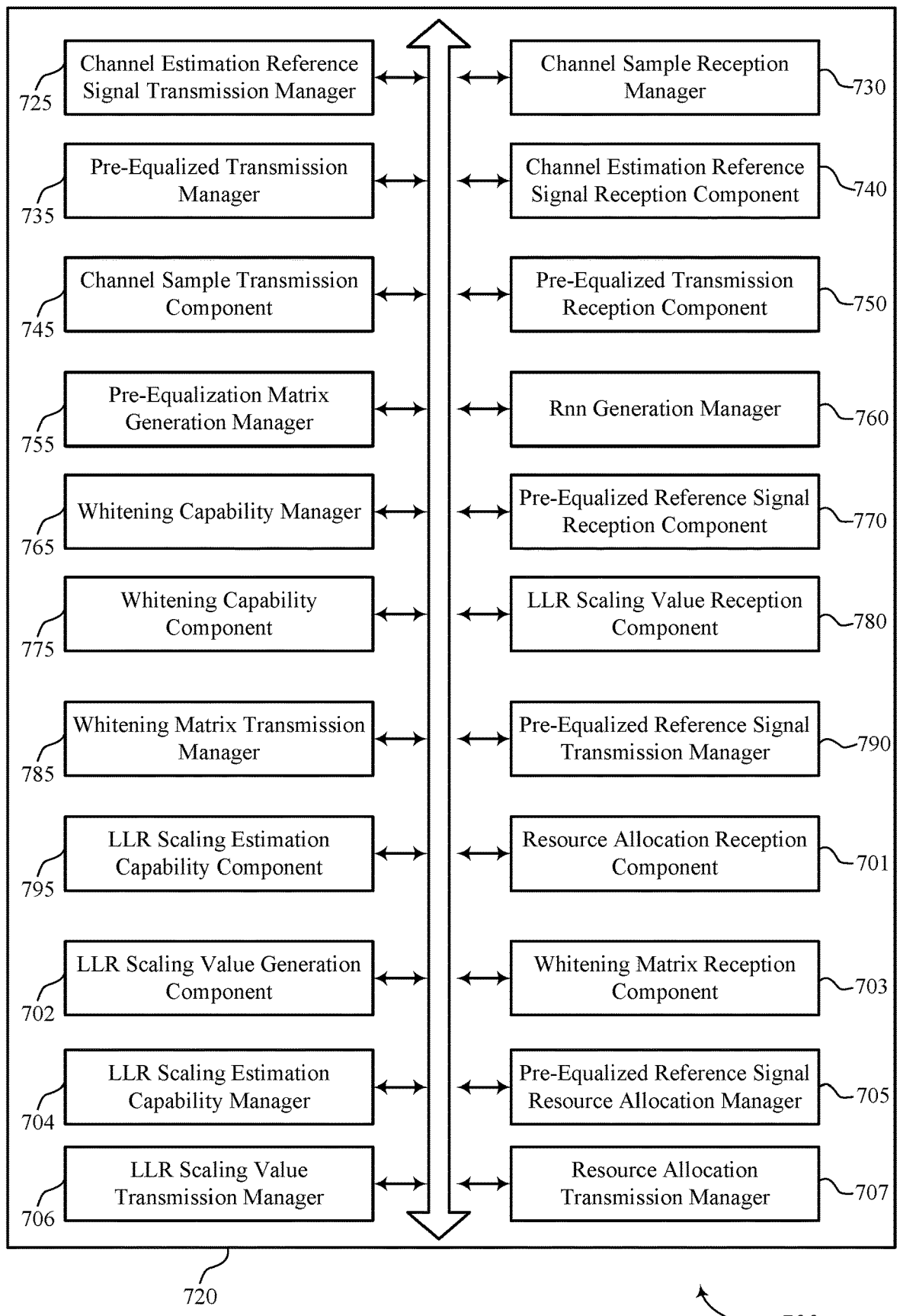
FIG. 7 shows a block diagram of a communications manager that supports Rnn and LLR scaling for pre-equalization-based communication schemes in accordance with one or more aspects of the present disclosure.

FIG. 7 shows a block diagram 700 of a communications manager 720 that supports Rnn and LLR scaling for pre-equalization-based communication schemes in accordance with one or more aspects of the present disclosure. The communications manager 720 may be an example of aspects of a communications manager 520, a communications manager 620, or both, as described herein. The communications manager 720, or various components thereof, may be an example of means for performing various aspects of Rnn and LLR scaling for pre-equalization-based communication schemes as described herein. For example, the communications manager 720 may include a channel estimation reference signal transmission manager 725, a channel sample reception manager 730, a pre-equalized transmission manager 735, a channel estimation reference signal reception component 740, a channel sample transmission component 745, a pre-equalized transmission reception component 750, a pre-equalization matrix generation manager 755, a Rnn generation manager 760, a whitening capability manager 765, a pre-equalized reference signal reception component 770, a whitening capability component 775, an LLR scaling value reception component 780, a whitening matrix transmission manager 785, a pre-equalized reference signal transmission manager 790, an LLR scaling estimation capability component 795, a resource allocation reception component 701, an LLR scaling value generation component 702, a whitening matrix reception component 703, an LLR scaling estimation capability manager 704, a pre-equalized reference signal resource allocation manager 705, an LLR scaling value transmission manager 706, a resource allocation transmission manager 707, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The channel estimation reference signal transmission manager 725 is capable of, configured to, or operable to support a means for transmitting, to a second UE, a set of channel estimation reference signals dedicated for channel estimation of a channel between the first UE and the second UE. The channel sample reception manager 730 is capable of, configured to, or operable to support a means for receiving, from the second UE and in response to the set of channel estimation reference signals, a set of quantized samples of the channel for channel estimation, the set of quantized samples based on the set of channel estimation reference signals. The pre-equalized transmission manager 735 is capable of, configured to, or operable to support a means for transmitting, to the second UE, one or more pre-equalized transmissions that are pre-equalized based on a pre-equalization matrix, where the pre-equalization matrix is based on Rnn associated with the set of quantized samples of the channel.

In some examples, the pre-equalization matrix generation manager 755 is capable of, configured to, or operable to support a means for generating the pre-equalization matrix using one or more diagonal elements of a matrix associated with the Rnn based on a capability of second UE device to perform whitening.

In some examples, the pre-equalization matrix generation manager 755 is capable of, configured to, or operable to support a means for generating the pre-equalization matrix using all elements of a matrix associated with the Rnn based on a capability of the second UE to perform whitening.

In some examples, the Rnn generation manager 760 is capable of, configured to, or operable to support a means for generating the Rnn based on filtering a set of multiple matrices associated with Rnn, where the set of multiple matrices is based on a set of multiple quantized samples of the channel, and where the set of multiple quantized samples of the channel includes the set of quantized samples of the channel.

In some examples, the whitening capability manager 765 is capable of, configured to, or operable to support a means for receiving, from the second UE, a capability message that indicates a capability of the second UE to perform whitening.

In some examples, the whitening matrix transmission manager 785 is capable of, configured to, or operable to support a means for transmitting, to the second UE, a message indicating one or more whitening matrices for the second UE to apply to the channel, where the message is transmitted based on the capability of the second UE to perform whitening.

In some examples, the pre-equalized reference signal transmission manager 790 is capable of, configured to, or operable to support a means for transmitting, to the second UE, one or more pre-equalized reference signals that are pre-equalized based on the pre-equalization matrix, where transmission of the one or more pre-equalized reference signals is based on a capability of the second UE to perform LLR scaling estimation.

In some examples, the LLR scaling estimation capability manager 704 is capable of, configured to, or operable to support a means for receiving, from the second UE, a capability message indicating the capability of the second UE to perform LLR scaling estimation.

In some examples, the pre-equalized reference signal resource allocation manager 705 is capable of, configured to, or operable to support a means for selecting a resource allocation associated with the one or more pre-equalized reference signals based on one or more characteristics of the channel and the capability of the second UE to perform LLR scaling estimation, where selecting the resource allocation includes selecting the resource allocation from a set of multiple configured resource allocations associated with the one or more pre-equalized reference signals.

In some examples, the resource allocation transmission manager 707 is capable of, configured to, or operable to support a means for transmitting, to the second UE, a message indicating a configuration of the resource allocation associated with the one or more pre-equalized reference signals.

In some examples, the one or more characteristics of the channel include a signal-to-noise ratio, a signal-to-noise-plus-interference ratio, an interference associated with the channel, a quality associated with the channel, or some combination thereof.

In some examples, the LLR scaling value transmission manager 706 is capable of, configured to, or operable to support a means for transmitting, to the second UE, a message indicating one or more LLR scaling values.

Additionally, or alternatively, the communications manager 720 may support wireless communications in accordance with examples as disclosed herein. The channel estimation reference signal reception component 740 is capable of, configured to, or operable to support a means for receiving, from a first UE, a set of channel estimation reference signals dedicated for channel estimation of a channel between the second UE and the first UE. The channel sample transmission component 745 is capable of, configured to, or operable to support a means for transmitting, to the first UE and in response to the set of channel estimation reference signals, a set of quantized samples of the channel for channel estimation, the set of quantized samples based on the set of channel estimation reference signals. The pre-equalized transmission reception component 750 is capable of, configured to, or operable to support a means for receiving, from the first UE, one or more pre-equalized transmissions that are pre-equalized based on a pre-equalization matrix, where the pre-equalization matrix is based on Rnn associated with the set of quantized samples of the channel.

In some examples, the pre-equalized reference signal reception component 770 is capable of, configured to, or operable to support a means for receiving, from the first UE, one or more pre-equalized reference signals that are pre-equalized based on the pre-equalization matrix, where receiving the one or more pre-equalized reference signals is based on a capability of the second UE to perform LLR scaling estimation.

In some examples, the LLR scaling estimation capability component 795 is capable of, configured to, or operable to support a means for transmitting, to the first UE, a capability message indicating the capability of the second UE to perform LLR scaling estimation.

In some examples, the resource allocation reception component 701 is capable of, configured to, or operable to support a means for receiving, from the first UE, a message indicating a configuration of a resource allocation associated with the one or more pre-equalized reference signals.

In some examples, the LLR scaling value generation component 702 is capable of, configured to, or operable to support a means for generating one or more LLR scaling values based on measurements of the one or more pre-equalized reference signals.

In some examples, the whitening capability component 775 is capable of, configured to, or operable to support a means for transmitting, to the first UE, a capability message that indicates a capability of the second UE to perform whitening.

In some examples, the whitening matrix reception component 703 is capable of, configured to, or operable to support a means for receiving, from the first UE, a message indicating one or more whitening matrices for the second UE to apply to the channel, where the message is received based on the capability of the second UE to perform whitening.

In some examples, the LLR scaling value reception component 780 is capable of, configured to, or operable to support a means for receiving, from the first UE, a message indicating one or more LLR scaling values.

Figure 8:
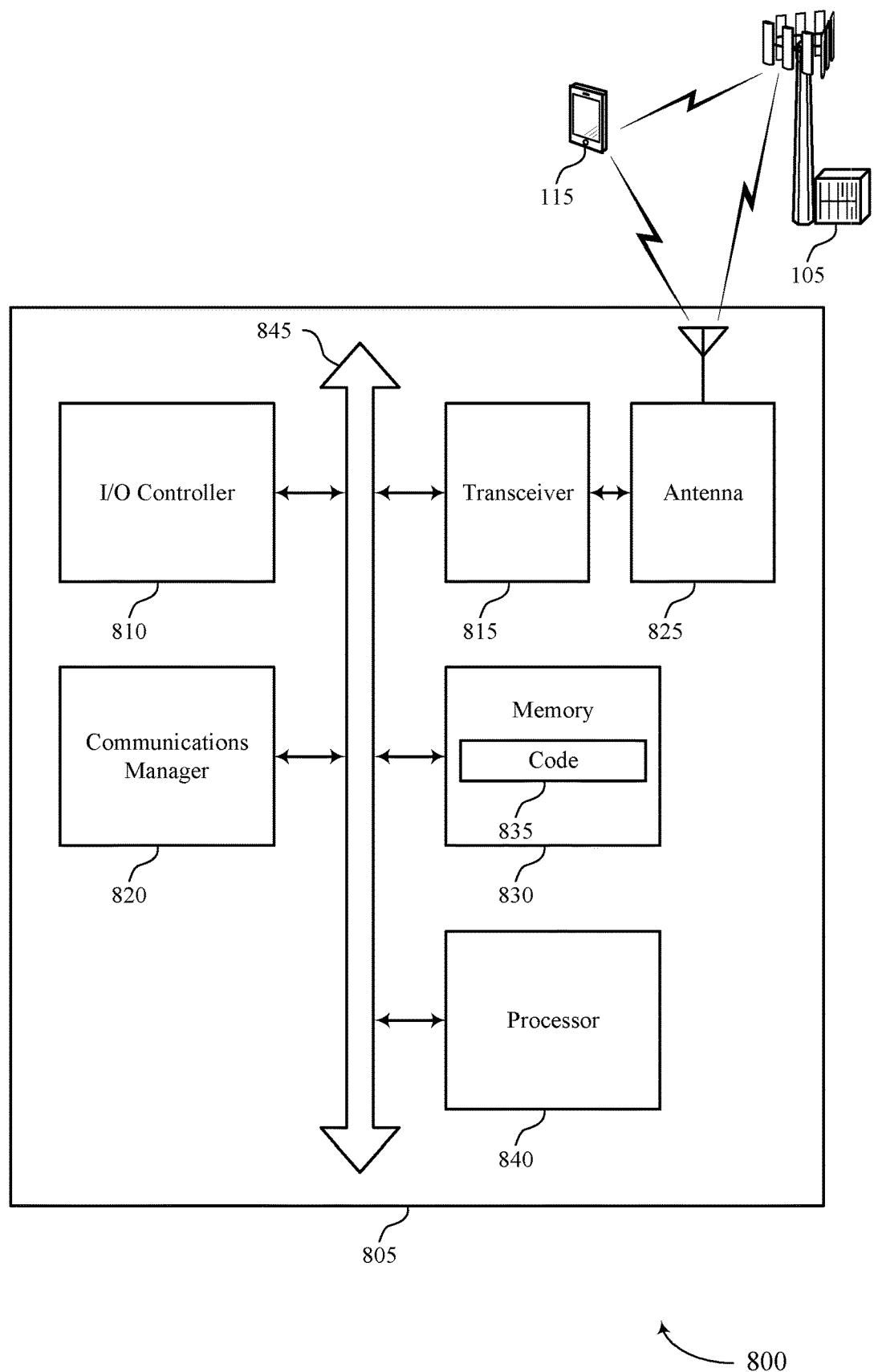
FIG. 8 shows a diagram of a system including a device that supports Rnn and LLR scaling for pre-equalization-based communication schemes in accordance with one or more aspects of the present disclosure.

FIG. 8 shows a diagram of a system 800 including a device 805 that supports Rnn and LLR scaling for pre-equalization-based communication schemes in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting Rnn and LLR scaling for pre-equalization-based communication schemes). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein.

The communications manager 820 may support wireless communications in accordance with examples as disclosed herein. For example, the communications manager 820 is capable of, configured to, or operable to support a means for transmitting, to a second UE, a set of channel estimation reference signals dedicated for channel estimation of a channel between the first UE and the second UE. The communications manager 820 is capable of, configured to, or operable to support a means for receiving, from the second UE and in response to the set of channel estimation reference signals, a set of quantized samples of the channel for channel estimation, the set of quantized samples based on the set of channel estimation reference signals. The communications manager 820 is capable of, configured to, or operable to support a means for transmitting, to the second UE, one or more pre-equalized transmissions that are pre-equalized based on a pre-equalization matrix, where the pre-equalization matrix is based on Rnn associated with the set of quantized samples of the channel.

Additionally, or alternatively, the communications manager 820 may support wireless communications in accordance with examples as disclosed herein. For example, the communications manager 820 is capable of, configured to, or operable to support a means for receiving, from a first UE, a set of channel estimation reference signals dedicated for channel estimation of a channel between the second UE and the first UE. The communications manager 820 is capable of, configured to, or operable to support a means for transmitting, to the first UE and in response to the set of channel estimation reference signals, a set of quantized samples of the channel for channel estimation, the set of quantized samples based on the set of channel estimation reference signals. The communications manager 820 is capable of, configured to, or operable to support a means for receiving, from the first UE, one or more pre-equalized transmissions that are pre-equalized based on a pre-equalization matrix, where the pre-equalization matrix is based on Rnn associated with the set of quantized samples of the channel.

By including or configuring the communications manager 820 in accordance with examples as described herein, the device 805 may support techniques for Rnn estimation and LLR scaling estimation, which may allow for improved communication reliability, reduced latency, improved user experience related to reduced processing, reduced power consumption, and longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of Rnn and LLR scaling for pre-equalization-based communication schemes as described herein, or the at least one processor 840 and the at least one memory 830 may be otherwise configured to, individually or collectively, perform or support such operations.

Figure 9:
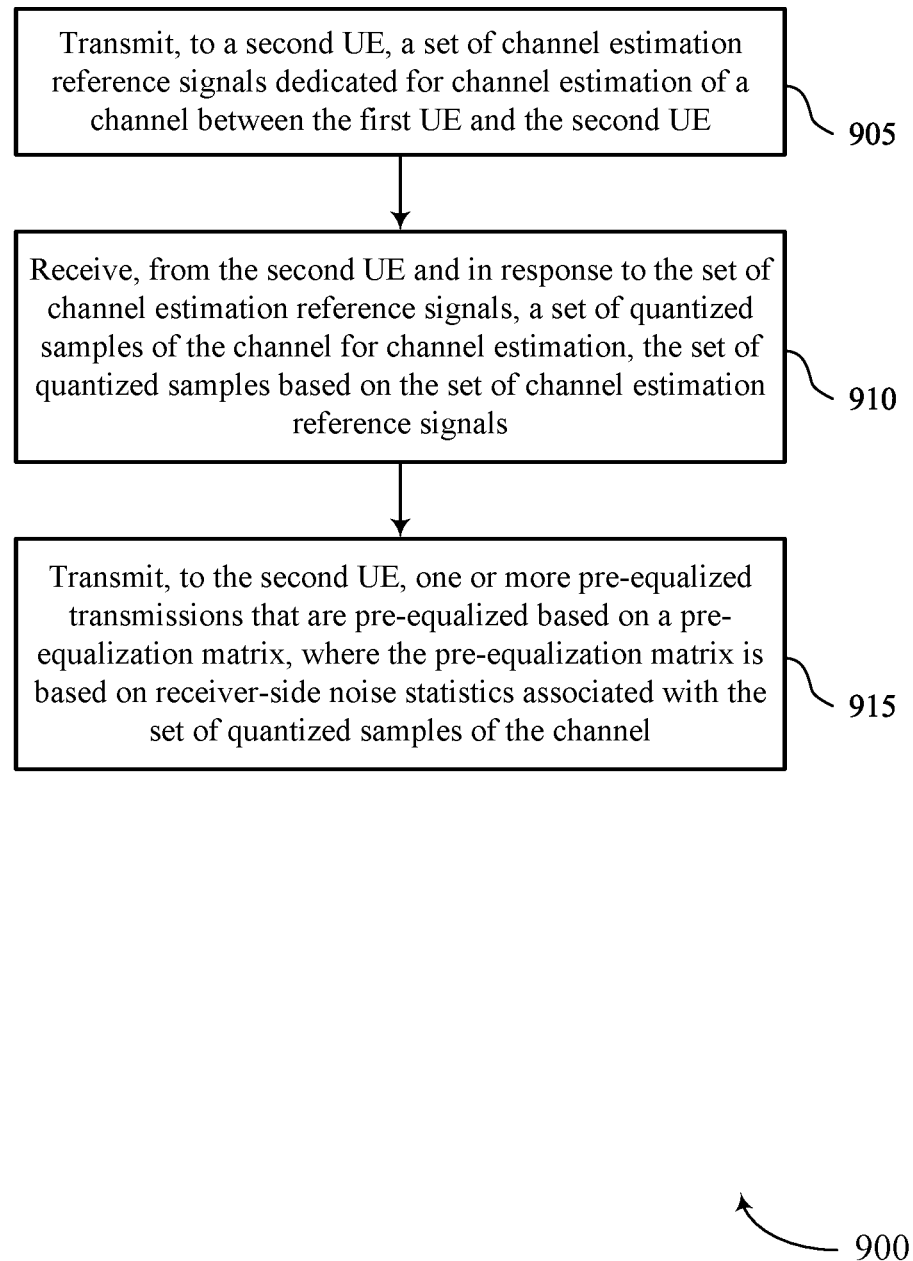
FIGS. 9 through 14 show flowcharts illustrating methods that support Rnn and LLR scaling for pre-equalization-based communication schemes in accordance with one or more aspects of the present disclosure.

FIG. 9 shows a flowchart illustrating a method 900 that supports Rnn and LLR scaling for pre-equalization-based communication schemes in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include transmitting, to a second UE, a set of channel estimation reference signals dedicated for channel estimation of a channel between the first UE and the second UE. The operations of 905 may be performed in accordance with examples as disclosed herein. In some examples, aspects of the operations of 905 may be performed by a channel estimation reference signal transmission manager 725 as described with reference to FIG. 7.

At 910, the method may include receiving, from the second UE and in response to the set of channel estimation reference signals, a set of quantized samples of the channel for channel estimation, the set of quantized samples based on the set of channel estimation reference signals. The operations of 910 may be performed in accordance with examples as disclosed herein. In some examples, aspects of the operations of 910 may be performed by a channel sample reception manager 730 as described with reference to FIG. 7.

At 915, the method may include transmitting, to the second UE, one or more pre-equalized transmissions that are pre-equalized based on a pre-equalization matrix, where the pre-equalization matrix is based on Rnn associated with the set of quantized samples of the channel. The operations of 915 may be performed in accordance with examples as disclosed herein. In some examples, aspects of the operations of 915 may be performed by a pre-equalized transmission manager 735 as described with reference to FIG. 7.

Figure 10:
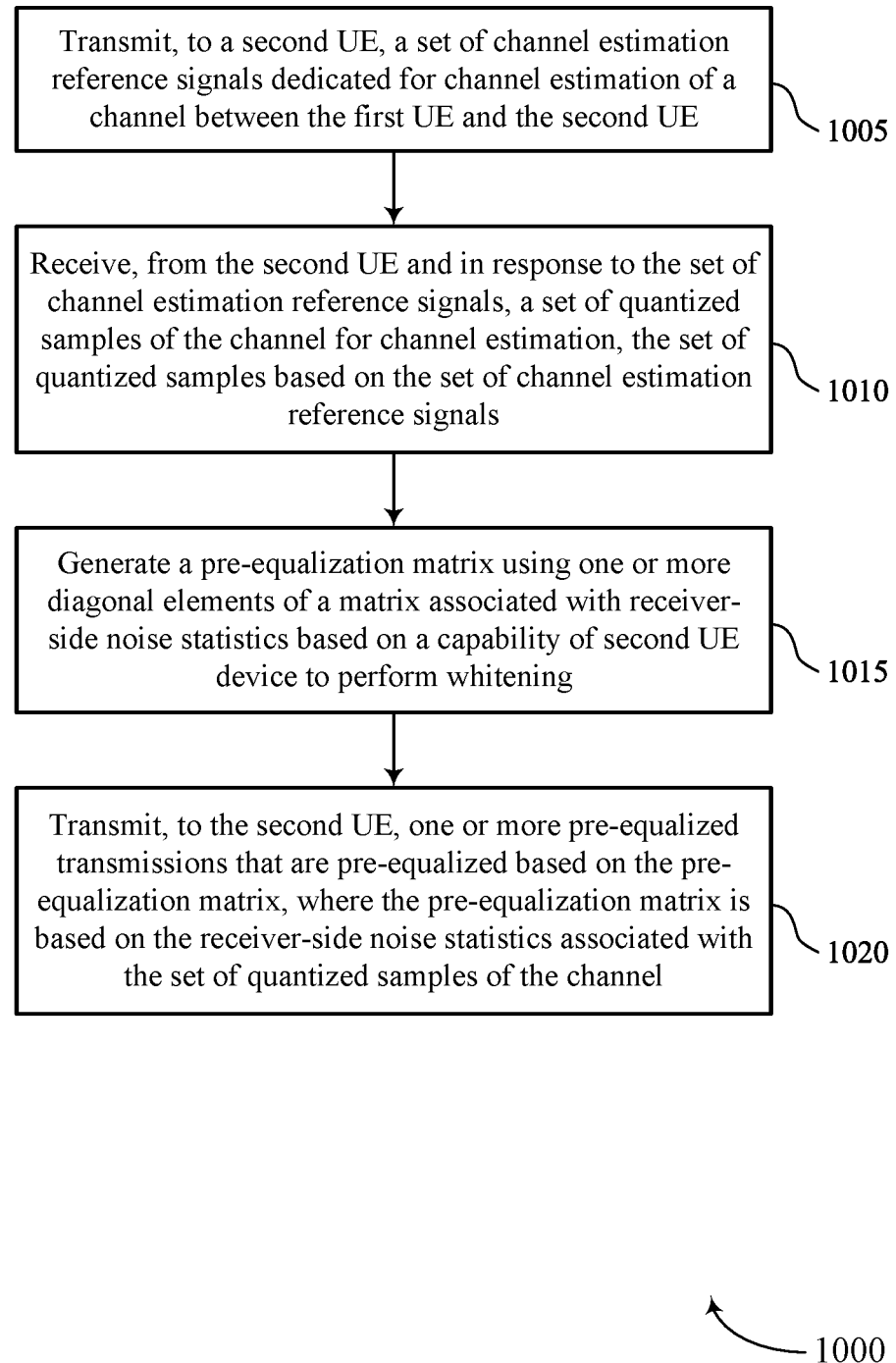

FIG. 10 shows a flowchart illustrating a method 1000 that supports Rnn and LLR scaling for pre-equalization-based communication schemes in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include transmitting, to a second UE, a set of channel estimation reference signals dedicated for channel estimation of a channel between the first UE and the second UE. The operations of 1005 may be performed in accordance with examples as disclosed herein. In some examples, aspects of the operations of 1005 may be performed by a channel estimation reference signal transmission manager 725 as described with reference to FIG. 7.

At 1010, the method may include receiving, from the second UE and in response to the set of channel estimation reference signals, a set of quantized samples of the channel for channel estimation, the set of quantized samples based on the set of channel estimation reference signals. The operations of 1010 may be performed in accordance with examples as disclosed herein. In some examples, aspects of the operations of 1010 may be performed by a channel sample reception manager 730 as described with reference to FIG. 7.

At 1015, the method may include generating a pre-equalization matrix using one or more diagonal elements of a matrix associated with Rnn based on a capability of second UE device to perform whitening. The operations of 1015 may be performed in accordance with examples as disclosed herein. In some examples, aspects of the operations of 1015 may be performed by a pre-equalization matrix generation manager 755 as described with reference to FIG. 7.

At 1020, the method may include transmitting, to the second UE, one or more pre-equalized transmissions that are pre-equalized based on the pre-equalization matrix, where the pre-equalization matrix is based on the Rnn associated with the set of quantized samples of the channel. The operations of 1020 may be performed in accordance with examples as disclosed herein. In some examples, aspects of the operations of 1020 may be performed by a pre-equalized transmission manager 735 as described with reference to FIG. 7.

Figure 11:
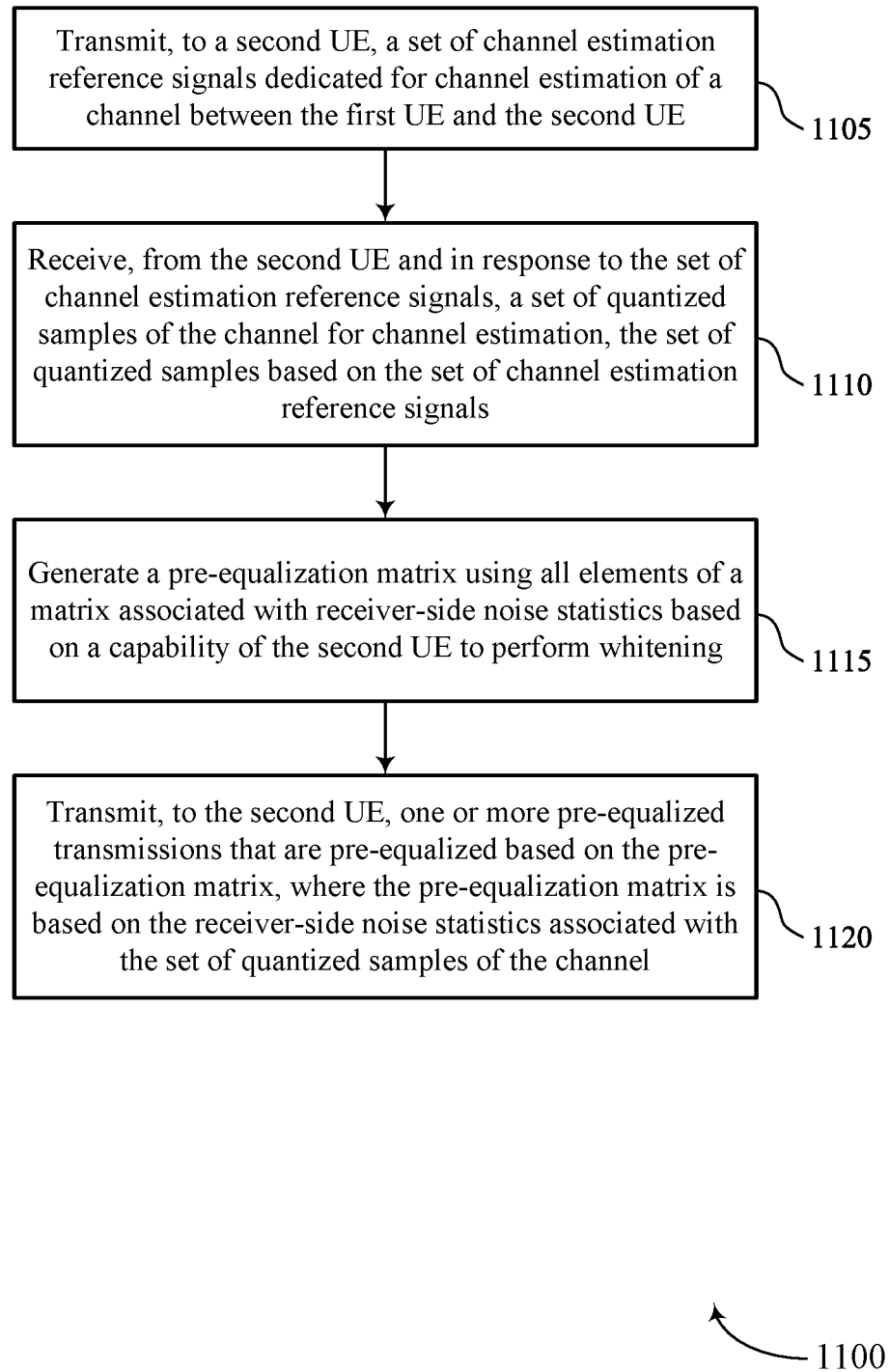

FIG. 11 shows a flowchart illustrating a method 1100 that supports Rnn and LLR scaling for pre-equalization-based communication schemes in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include transmitting, to a second UE, a set of channel estimation reference signals dedicated for channel estimation of a channel between the first UE and the second UE. The operations of 1105 may be performed in accordance with examples as disclosed herein. In some examples, aspects of the operations of 1105 may be performed by a channel estimation reference signal transmission manager 725 as described with reference to FIG. 7.

At 1110, the method may include receiving, from the second UE and in response to the set of channel estimation reference signals, a set of quantized samples of the channel for channel estimation, the set of quantized samples based on the set of channel estimation reference signals. The operations of 1110 may be performed in accordance with examples as disclosed herein. In some examples, aspects of the operations of 1110 may be performed by a channel sample reception manager 730 as described with reference to FIG. 7.

At 1115, the method may include generating a pre-equalization matrix using all elements of a matrix associated with Rnn based on a capability of the second UE to perform whitening. The operations of 1115 may be performed in accordance with examples as disclosed herein. In some examples, aspects of the operations of 1115 may be performed by a pre-equalization matrix generation manager 755 as described with reference to FIG. 7.

At 1120, the method may include transmitting, to the second UE, one or more pre-equalized transmissions that are pre-equalized based on the pre-equalization matrix, where the pre-equalization matrix is based on the Rnn associated with the set of quantized samples of the channel. The operations of 1120 may be performed in accordance with examples as disclosed herein. In some examples, aspects of the operations of 1120 may be performed by a pre-equalized transmission manager 735 as described with reference to FIG. 7.

Figure 12:
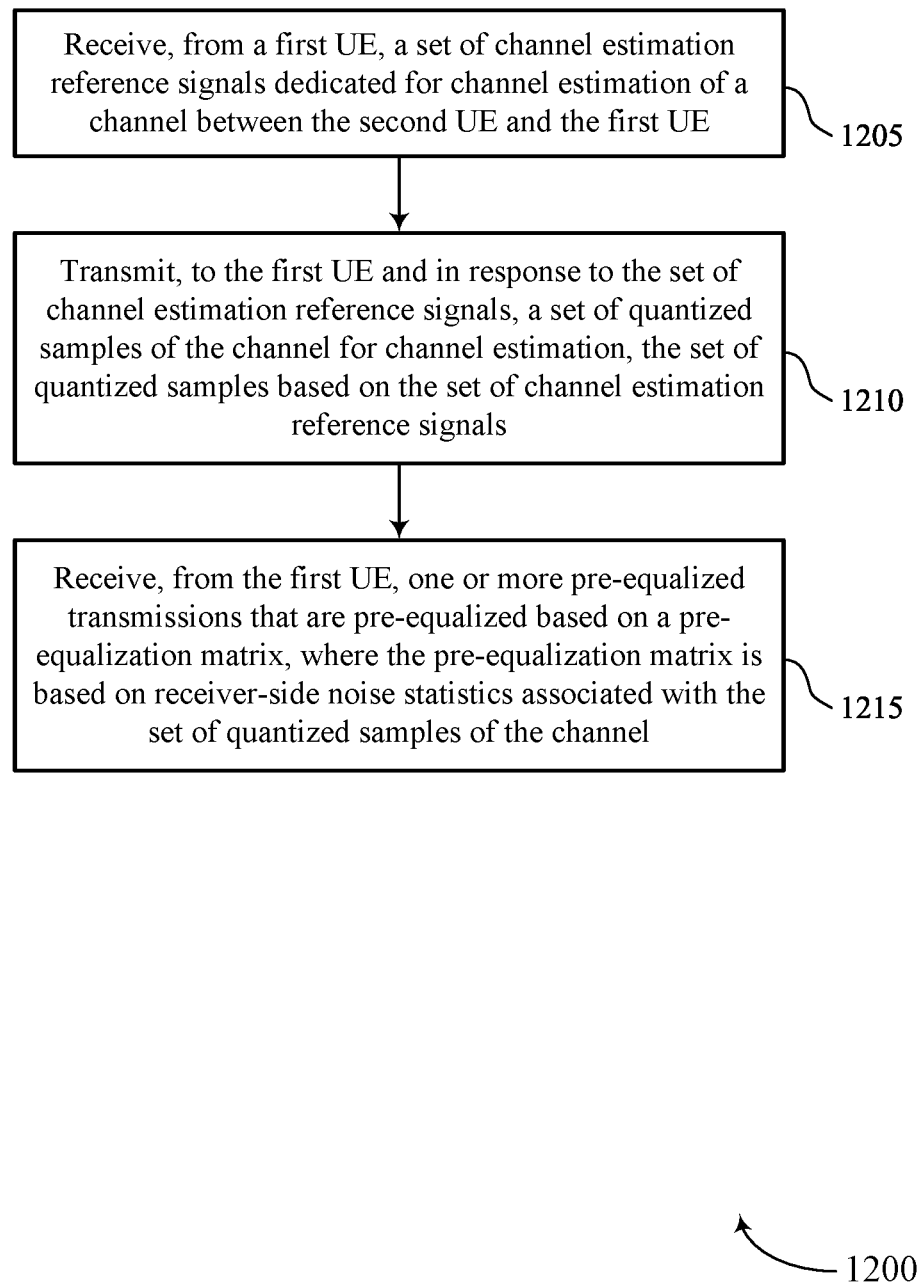

FIG. 12 shows a flowchart illustrating a method 1200 that supports Rnn and LLR scaling for pre-equalization-based communication schemes in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving, from a first UE, a set of channel estimation reference signals dedicated for channel estimation of a channel between the second UE and the first UE. The operations of 1205 may be performed in accordance with examples as disclosed herein. In some examples, aspects of the operations of 1205 may be performed by a channel estimation reference signal reception component 740 as described with reference to FIG. 7.

At 1210, the method may include transmitting, to the first UE and in response to the set of channel estimation reference signals, a set of quantized samples of the channel for channel estimation, the set of quantized samples based on the set of channel estimation reference signals. The operations of 1210 may be performed in accordance with examples as disclosed herein. In some examples, aspects of the operations of 1210 may be performed by a channel sample transmission component 745 as described with reference to FIG. 7.

At 1215, the method may include receiving, from the first UE, one or more pre-equalized transmissions that are pre-equalized based on a pre-equalization matrix, where the pre-equalization matrix is based on Rnn associated with the set of quantized samples of the channel. The operations of 1215 may be performed in accordance with examples as disclosed herein. In some examples, aspects of the operations of 1215 may be performed by a pre-equalized transmission reception component 750 as described with reference to FIG. 7.

Figure 13:
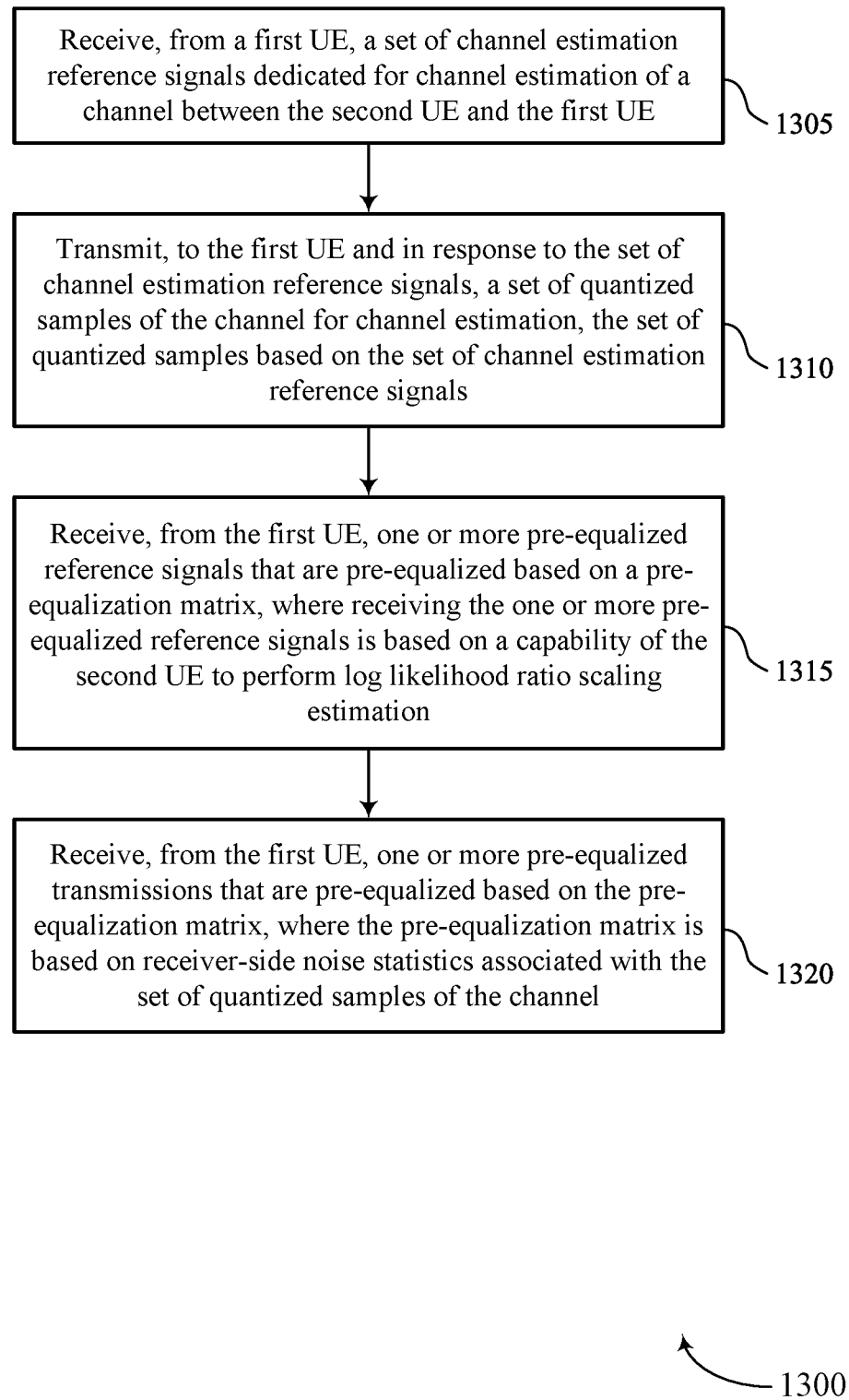

FIG. 13 shows a flowchart illustrating a method 1300 that supports Rnn and LLR scaling for pre-equalization-based communication schemes in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a first UE, a set of channel estimation reference signals dedicated for channel estimation of a channel between the second UE and the first UE. The operations of 1305 may be performed in accordance with examples as disclosed herein. In some examples, aspects of the operations of 1305 may be performed by a channel estimation reference signal reception component 740 as described with reference to FIG. 7.

At 1310, the method may include transmitting, to the first UE and in response to the set of channel estimation reference signals, a set of quantized samples of the channel for channel estimation, the set of quantized samples based on the set of channel estimation reference signals. The operations of 1310 may be performed in accordance with examples as disclosed herein. In some examples, aspects of the operations of 1310 may be performed by a channel sample transmission component 745 as described with reference to FIG. 7.

At 1315, the method may include receiving, from the first UE, one or more pre-equalized reference signals that are pre-equalized based on a pre-equalization matrix, where receiving the one or more pre-equalized reference signals is based on a capability of the second UE to perform LLR scaling estimation. The operations of 1315 may be performed in accordance with examples as disclosed herein. In some examples, aspects of the operations of 1315 may be performed by a pre-equalized reference signal reception component 770 as described with reference to FIG. 7.

At 1320, the method may include receiving, from the first UE, one or more pre-equalized transmissions that are pre-equalized based on the pre-equalization matrix, where the pre-equalization matrix is based on Rnn associated with the set of quantized samples of the channel. The operations of 1320 may be performed in accordance with examples as disclosed herein. In some examples, aspects of the operations of 1320 may be performed by a pre-equalized transmission reception component 750 as described with reference to FIG. 7.

Figure 14:
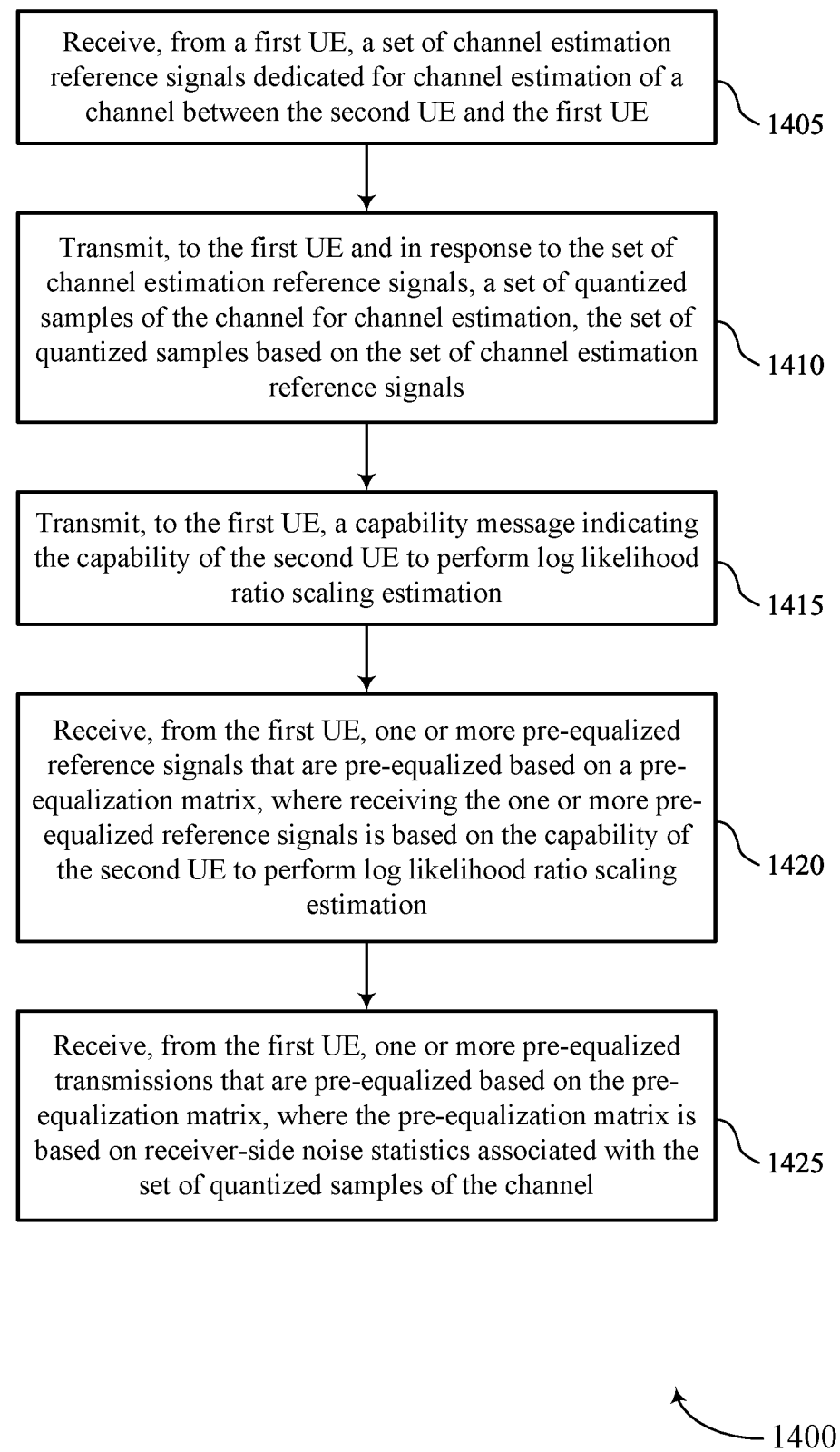

FIG. 14 shows a flowchart illustrating a method 1400 that supports Rnn and LLR scaling for pre-equalization-based communication schemes in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a first UE, a set of channel estimation reference signals dedicated for channel estimation of a channel between the second UE and the first UE. The operations of 1405 may be performed in accordance with examples as disclosed herein. In some examples, aspects of the operations of 1405 may be performed by a channel estimation reference signal reception component 740 as described with reference to FIG. 7.

At 1410, the method may include transmitting, to the first UE and in response to the set of channel estimation reference signals, a set of quantized samples of the channel for channel estimation, the set of quantized samples based on the set of channel estimation reference signals. The operations of 1410 may be performed in accordance with examples as disclosed herein. In some examples, aspects of the operations of 1410 may be performed by a channel sample transmission component 745 as described with reference to FIG. 7.

At 1415, the method may include transmitting, to the first UE, a capability message indicating the capability of the second UE to perform LLR scaling estimation. The operations of 1415 may be performed in accordance with examples as disclosed herein. In some examples, aspects of the operations of 1415 may be performed by an LLR scaling estimation capability component 795 as described with reference to FIG. 7.

At 1420, the method may include receiving, from the first UE, one or more pre-equalized reference signals that are pre-equalized based on a pre-equalization matrix, where receiving the one or more pre-equalized reference signals is based on the capability of the second UE to perform LLR scaling estimation. The operations of 1420 may be performed in accordance with examples as disclosed herein. In some examples, aspects of the operations of 1420 may be performed by a pre-equalized reference signal reception component 770 as described with reference to FIG. 7.

At 1425, the method may include receiving, from the first UE, one or more pre-equalized transmissions that are pre-equalized based on the pre-equalization matrix, where the pre-equalization matrix is based on Rnn associated with the set of quantized samples of the channel. The operations of 1425 may be performed in accordance with examples as disclosed herein. In some examples, aspects of the operations of 1425 may be performed by a pre-equalized transmission reception component 750 as described with reference to FIG. 7.

The following provides an overview of aspects of the present disclosure:

Aspect 1: A method for wireless communications by a first UE, comprising: transmitting, to a second UE, a set of channel estimation reference signals dedicated for channel estimation of a channel between the first UE and the second UE; receiving, from the second UE and in response to the set of channel estimation reference signals, a set of quantized samples of the channel for channel estimation, the set of quantized samples based at least in part on the set of channel estimation reference signals; and transmitting, to the second UE, one or more pre-equalized transmissions that are pre-equalized based at least in part on a pre-equalization matrix, wherein the pre-equalization matrix is based at least in part on Rnn associated with the set of quantized samples of the channel.

Aspect 2: The method of aspect 1, further comprising: generating the pre-equalization matrix using one or more diagonal elements of a matrix associated with the Rnn based at least in part on a capability of second UE device to perform whitening.

Aspect 3: The method of aspect 1, further comprising: generating the pre-equalization matrix using all elements of a matrix associated with the Rnn based at least in part on a capability of the second UE to perform whitening.

Aspect 4: The method of any of aspects 1 through 3, further comprising: generating the Rnn based at least in part on filtering a plurality of matrices associated with Rnn, wherein the plurality of matrices is based at least in part on a plurality of quantized samples of the channel, and wherein the plurality of quantized samples of the channel comprises the set of quantized samples of the channel.

Aspect 5: The method of any of aspects 1 through 4, further comprising: receiving, from the second UE, a capability message that indicates a capability of the second UE to perform whitening.

Aspect 6: The method of aspect 5, further comprising: transmitting, to the second UE, a message indicating one or more whitening matrices for the second UE to apply to the channel, wherein the message is transmitted based at least in part on the capability of the second UE to perform whitening.

Aspect 7: The method of any of aspects 5 through 6, further comprising: transmitting, to the second UE, one or more pre-equalized reference signals that are pre-equalized based at least in part on the pre-equalization matrix, wherein transmission of the one or more pre-equalized reference signals is based at least in part on a capability of the second UE to perform LRR scaling estimation.

Aspect 8: The method of aspect 7, further comprising: receiving, from the second UE, a capability message indicating the capability of the second UE to perform LRR scaling estimation.

Aspect 9: The method of aspect 8, further comprising: selecting a resource allocation associated with the one or more pre-equalized reference signals based at least in part on one or more characteristics of the channel and the capability of the second UE to perform LRR scaling estimation, wherein selecting the resource allocation comprises selecting the resource allocation from a plurality of configured resource allocations associated with the one or more pre-equalized reference signals.

Aspect 10: The method of aspect 9, further comprising: transmitting, to the second UE, a message indicating a configuration of the resource allocation associated with the one or more pre-equalized reference signals.

Aspect 11: The method of any of aspects 9 through 10, wherein the one or more characteristics of the channel comprise a SNR, a SNIR, an interference associated with the channel, a quality associated with the channel, or some combination thereof.

Aspect 12: The method of any of aspects 8 through 11, further comprising: transmitting, to the second UE, a message indicating one or more LRR scaling values.

Aspect 13: A method for wireless communications by a second UE, comprising: receiving, from a first UE, a set of channel estimation reference signals dedicated for channel estimation of a channel between the second UE and the first UE; transmitting, to the first UE and in response to the set of channel estimation reference signals, a set of quantized samples of the channel for channel estimation, the set of quantized samples based at least in part on the set of channel estimation reference signals; and receiving, from the first UE, one or more pre-equalized transmissions that are pre-equalized based at least in part on a pre-equalization matrix, wherein the pre-equalization matrix is based at least in part on Rnn associated with the set of quantized samples of the channel.

Aspect 14: The method of aspect 13, further comprising: receiving, from the first UE, one or more pre-equalized reference signals that are pre-equalized based at least in part on the pre-equalization matrix, wherein receiving the one or more pre-equalized reference signals is based at least in part on a capability of the second UE to perform LRR scaling estimation.

Aspect 15: The method of aspect 14, further comprising: transmitting, to the first UE, a capability message indicating the capability of the second UE to perform LRR scaling estimation.

Aspect 16: The method of any of aspects 14 through 15, further comprising: receiving, from the first UE, a message indicating a configuration of a resource allocation associated with the one or more pre-equalized reference signals.

Aspect 17: The method of any of aspects 14 through 16, further comprising: generating one or more LRR scaling values based at least in part on measurements of the one or more pre-equalized reference signals.

Aspect 18: The method of any of aspects 13 through 17, further comprising: transmitting, to the first UE, a capability message that indicates a capability of the second UE to perform whitening.

Aspect 19: The method of aspect 18, further comprising: receiving, from the first UE, a message indicating one or more whitening matrices for the second UE to apply to the channel, wherein the message is received based at least in part on the capability of the second UE to perform whitening.

Aspect 20: The method of any of aspects 13 through 19, further comprising: receiving, from the first UE, a message indicating one or more LRR scaling values.

Aspect 21: A first UE for wireless communications, comprising one or more memories storing processor-executable code, and one or more processors coupled with the one or more memories and individually or collectively operable to execute the code to cause the first UE to perform a method of any of aspects 1 through 12.

Aspect 22: A first UE for wireless communications, comprising at least one means for performing a method of any of aspects 1 through 12.

Aspect 23: A non-transitory computer-readable medium storing code for wireless communications, the code comprising instructions executable by a processor to perform a method of any of aspects 1 through 12.

Aspect 24: A second UE for wireless communications, comprising one or more memories storing processor-executable code, and one or more processors coupled with the one or more memories and individually or collectively operable to execute the code to cause the second UE to perform a method of any of aspects 13 through 20.

Aspect 25: A second UE for wireless communications, comprising at least one means for performing a method of any of aspects 13 through 20.

Aspect 26: A non-transitory computer-readable medium storing code for wireless communications, the code comprising instructions executable by a processor to perform a method of any of aspects 13 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:
one or more memories storing processor-executable code; and
one or more processors coupled with the one or more memories and individually or collectively operable to execute the code to cause the first UE to:
transmit, to a second UE, a set of channel estimation reference signals dedicated for channel estimation of a channel between the first UE and the second UE;
receive, from the second UE and in response to the set of channel estimation reference signals, a set of quantized samples of the channel for channel estimation, the set of quantized samples based at least in part on the set of channel estimation reference signals; and
transmit, to the second UE, one or more pre-equalized transmissions that are pre-equalized based at least in part on a pre-equalization matrix, wherein the pre-equalization matrix is based at least in part on receiver-side noise statistics associated with the set of quantized samples of the channel.

2. The first UE of claim 1, wherein the one or more processors are individually or collectively further operable to execute the code to cause the first UE to:
generate the pre-equalization matrix using one or more diagonal elements of a matrix associated with the receiver-side noise statistics based at least in part on a capability of second UE device to perform whitening.

3. The first UE of claim 1, wherein the one or more processors are individually or collectively further operable to execute the code to cause the first UE to:
generate the pre-equalization matrix using all elements of a matrix associated with the receiver-side noise statistics based at least in part on a capability of the second UE to perform whitening.

4. The first UE of claim 1, wherein the one or more processors are individually or collectively further operable to execute the code to cause the first UE to:
generate the receiver-side noise statistics based at least in part on filtering a plurality of matrices associated with receiver-side noise statistics, wherein the plurality of matrices is based at least in part on a plurality of quantized samples of the channel, and wherein the plurality of quantized samples of the channel comprises the set of quantized samples of the channel.

5. The first UE of claim 1, wherein the one or more processors are individually or collectively further operable to execute the code to cause the first UE to:
receive, from the second UE, a capability message that indicates a capability of the second UE to perform whitening.

6. The first UE of claim 5, wherein the one or more processors are individually or collectively further operable to execute the code to cause the first UE to:
transmit, to the second UE, a message indicating one or more whitening matrices for the second UE to apply to the channel, wherein the message is transmitted based at least in part on the capability of the second UE to perform whitening.

7. The first UE of claim 1, wherein the one or more processors are individually or collectively further operable to execute the code to cause the first UE to:
transmit, to the second UE, one or more pre-equalized reference signals that are pre-equalized based at least in part on the pre-equalization matrix, wherein transmission of the one or more pre-equalized reference signals is based at least in part on a capability of the second UE to perform log likelihood ratio scaling estimation.

8. The first UE of claim 7, wherein the one or more processors are individually or collectively further operable to execute the code to cause the first UE to:
receive, from the second UE, a capability message indicating the capability of the second UE to perform log likelihood ratio scaling estimation.

9. The first UE of claim 7, wherein the one or more processors are individually or collectively further operable to execute the code to cause the first UE to:
select a resource allocation associated with the one or more pre-equalized reference signals based at least in part on one or more characteristics of the channel and the capability of the second UE to perform log likelihood ratio scaling estimation, wherein selecting the resource allocation comprises selecting the resource allocation from a plurality of configured resource allocations associated with the one or more pre-equalized reference signals.

10. The first UE of claim 9, wherein the one or more processors are individually or collectively further operable to execute the code to cause the first UE to:
transmit, to the second UE, a message indicating a configuration of the resource allocation associated with the one or more pre-equalized reference signals.

11. The first UE of claim 1, wherein the one or more characteristics of the channel comprise a signal-to-noise ratio, a signal-to-noise-plus-interference ratio, an interference associated with the channel, a quality associated with the channel, or some combination thereof.

12. The first UE of claim 1, wherein the one or more processors are individually or collectively further operable to execute the code to cause the first UE to:
transmit, to the second UE, a message indicating one or more log likelihood ratio scaling values.

13. A second user equipment (UE), comprising:
one or more memories storing processor-executable code; and
one or more processors coupled with the one or more memories and individually or collectively operable to execute the code to cause the second UE to:
receive, from a first UE, a set of channel estimation reference signals dedicated for channel estimation of a channel between the second UE and the first UE;
transmit, to the first UE and in response to the set of channel estimation reference signals, a set of quantized samples of the channel for channel estimation, the set of quantized samples based at least in part on the set of channel estimation reference signals; and
receive, from the first UE, one or more pre-equalized transmissions that are pre-equalized based at least in part on a pre-equalization matrix, wherein the pre-equalization matrix is based at least in part on receiver-side noise statistics associated with the set of quantized samples of the channel.

14. The second UE of claim 13, wherein the one or more processors are individually or collectively further operable to execute the code to cause the second UE to:
receive, from the first UE, one or more pre-equalized reference signals that are pre-equalized based at least in part on the pre-equalization matrix, wherein receiving the one or more pre-equalized reference signals is based at least in part on a capability of the second UE to perform log likelihood ratio scaling estimation.

15. The second UE of claim 14, wherein the one or more processors are individually or collectively further operable to execute the code to cause the second UE to:
transmit, to the first UE, a capability message indicating the capability of the second UE to perform log likelihood ratio scaling estimation.

16. The second UE of claim 14, wherein the one or more processors are individually or collectively further operable to execute the code to cause the second UE to:
receive, from the first UE, a message indicating a configuration of a resource allocation associated with the one or more pre-equalized reference signals.

17. The second UE of claim 14, wherein the one or more processors are individually or collectively further operable to execute the code to cause the second UE to:
generate one or more log likelihood ratio scaling values based at least in part on measurements of the one or more pre-equalized reference signals.

18. The second UE of claim 13, wherein the one or more processors are individually or collectively further operable to execute the code to cause the second UE to:
transmit, to the first UE, a capability message that indicates a capability of the second UE to perform whitening.

19. The second UE of claim 18, wherein the one or more processors are individually or collectively further operable to execute the code to cause the second UE to:
receive, from the first UE, a message indicating one or more whitening matrices for the second UE to apply to the channel, wherein the message is received based at least in part on the capability of the second UE to perform whitening.

20. The second UE of claim 13, wherein the one or more processors are individually or collectively further operable to execute the code to cause the second UE to:
receive, from the first UE, a message indicating one or more log likelihood ratio scaling values.

21. A method for wireless communications by a first user equipment (UE), comprising:
transmitting, to a second UE, a set of channel estimation reference signals dedicated for channel estimation of a channel between the first UE and the second UE;
receiving, from the second UE and in response to the set of channel estimation reference signals, a set of quantized samples of the channel for channel estimation, the set of quantized samples based at least in part on the set of channel estimation reference signals; and
transmitting, to the second UE, one or more pre-equalized transmissions that are pre-equalized based at least in part on a pre-equalization matrix, wherein the pre-equalization matrix is based at least in part on receiver-side noise statistics associated with the set of quantized samples of the channel.

22. The method of claim 21, further comprising:
generating the pre-equalization matrix using one or more diagonal elements of a matrix associated with the receiver-side noise statistics based at least in part on a capability of the second UE to perform whitening.

23. The method of claim 21, further comprising:
generating the pre-equalization matrix using all elements of a matrix associated with the receiver-side noise statistics based at least in part on a capability of the second UE to perform whitening.

24. The method of claim 21, further comprising:
generating the receiver-side noise statistics based at least in part on filtering a plurality of matrices associated with receiver-side noise statistics, wherein the plurality of matrices is based at least in part on a plurality of quantized samples of the channel, and wherein the plurality of quantized samples of the channel comprises the set of quantized samples of the channel.

25. The method of claim 21, further comprising:
receiving, from the second UE, a capability message that indicates a capability of the second UE to perform whitening.

26. The method of claim 25, further comprising:
transmitting, to the second UE, a message indicating one or more whitening matrices for the second UE to apply to the channel, wherein the message is transmitted based at least in part on the capability of the second UE to perform whitening.

27. The method of claim 21, further comprising:
transmitting, to the second UE, one or more pre-equalized reference signals that are pre-equalized based at least in part on the pre-equalization matrix, wherein transmitting the one or more pre-equalized reference signals is based at least in part on a capability of the second UE to perform log likelihood ratio scaling estimation.

28. The method of claim 27, further comprising:
receiving, from the second UE, a capability message indicating the capability of the second UE to perform log likelihood ratio scaling estimation.

29. The method of claim 28, further comprising:
transmitting, to the second UE, a message indicating one or more log likelihood ratio scaling values, wherein the one or more log likelihood ratio scaling values are calculated based at least in part on the capability of the second UE to perform log likelihood ratio scaling estimation.

30. A method for wireless communications by a second user equipment (UE), comprising:
receiving, from a first UE, a set of channel estimation reference signals dedicated for channel estimation of a channel between the second UE and the first UE;
transmitting, to the first UE and in response to the set of channel estimation reference signals, a set of quantized samples of the channel for channel estimation, the set of quantized samples based at least in part on the set of channel estimation reference signals; and
receiving, from the first UE, one or more pre-equalized transmissions that are pre-equalized based at least in part on a pre-equalization matrix, wherein the pre-equalization matrix is based at least in part on receiver-side noise statistics associated with the set of quantized samples of the channel.

\* \* \* \* \*